US009253963B2

(12) United States Patent
Mays et al.

(10) Patent No.: US 9,253,963 B2
(45) Date of Patent: Feb. 9, 2016

(54) ANIMAL MARKING DEVICES, TRANSFER ASSEMBLIES, AND USEFUL RESTRAINTS

(75) Inventors: Ramos M. Mays, La Jolla, CA (US); Mark C. Pydynowski, San Francisco, CA (US); Mark A. Van Veen, Cardiff-by-the-Sea, CA (US); Ben Tse, San Diego, CA (US); George Albert Mansfield, San Diego, CA (US)

(73) Assignee: Somark Innovations, Inc., San Diego, CA (US)

( * ) Notice: Subject to any disclaimer, the term of this patent is extended or adjusted under 35 U.S.C. 154(b) by 717 days.

(21) Appl. No.: 13/393,912

(22) PCT Filed: Sep. 2, 2010

(86) PCT No.: PCT/US2010/047712
§ 371 (c)(1),
(2), (4) Date: May 15, 2012

(87) PCT Pub. No.: WO2011/028926
PCT Pub. Date: Mar. 10, 2011

(65) Prior Publication Data
US 2012/0226288 A1    Sep. 6, 2012

Related U.S. Application Data

(60) Provisional application No. 61/239,430, filed on Sep. 2, 2009.

(51) Int. Cl.
*A61B 17/00* (2006.01)
*A61D 1/04* (2006.01)
(Continued)

(52) U.S. Cl.
CPC . *A01K 11/00* (2013.01); *A61D 3/00* (2013.01); *Y10T 428/31855* (2015.04)

(58) Field of Classification Search
CPC ... A01K 11/00; A01K 11/005; A01K 1/0613; A01K 29/00; A61B 2503/40
USPC .......................................... 606/116; 119/840
See application file for complete search history.

(56) References Cited

U.S. PATENT DOCUMENTS

| 4,392,493 A | 7/1983 | Niemeijer |
| 4,440,078 A | 4/1984 | McCrery, Jr. et al. |

(Continued)

FOREIGN PATENT DOCUMENTS

| CN | 101057561 A | 10/2004 |
| CN | 1547430 A | 11/2004 |

(Continued)

OTHER PUBLICATIONS

CN Application No. 201080049308.5 Office Action Dated Oct. 30, 2013.
(Continued)

*Primary Examiner* — Katherine M Shi
(74) *Attorney, Agent, or Firm* — Wilson Sonsini Goodrich & Rosati

(57) ABSTRACT

Described herein is a marking system for marking animals. The marking system comprises a restraining device, a controller, and a robot assembly wherein the robot assembly comprises a robotic arm, a marking device attached thereto, and one or more actuators for manipulating the robotic arm and marking with the marking device; the robot assembly and the restraining device are positioned in a fixed manner relative to one another; the restraining device is sized and configured for restraining an animal or animal body part thereof and oriented such that the marking device can make a mark on a substrate portion of the animal body part; and the controller is configured to control the position of the marking device and to make a mark on the substrate portion of the animal body part by actuating the one or more actuators. Also described herein are media transfer assemblies and animal restraints.

24 Claims, 35 Drawing Sheets

(51) Int. Cl.
  *A01K 11/00*  (2006.01)
  *A61D 3/00*  (2006.01)

(56) References Cited

U.S. PATENT DOCUMENTS

| | | | |
|---|---|---|---|
| 6,013,122 | A | 1/2000 | Klitzman et al. |
| 6,263,762 | B1 | 7/2001 | Zeitler et al. |
| 6,901,885 | B1 * | 6/2005 | Kleinsasser .......... A01K 11/005 119/842 |
| 2004/0131234 | A1 | 7/2004 | Long et al. |
| 2004/0144333 | A1 * | 7/2004 | Finlayson .............. A01K 11/00 119/858 |
| 2004/0220527 | A1 | 11/2004 | Buckley et al. |
| 2006/0177649 | A1 | 8/2006 | Clark et al. |
| 2008/0036846 | A1 | 2/2008 | Hopkins et al. |
| 2008/0247637 | A1 | 10/2008 | Gildenberg |
| 2009/0311295 | A1 | 12/2009 | Mathiowitz et al. |
| 2014/0128880 | A1 | 5/2014 | Gandola et al. |

FOREIGN PATENT DOCUMENTS

| | | |
|---|---|---|
| EP | 0300110 A2 | 1/1989 |
| EP | 1911347 A1 | 4/2008 |
| EP | 2840890 | 3/2015 |
| WO | WO02082892 | 10/2002 |
| WO | WO2011028926 | 3/2011 |
| WO | WO 2013/163339 | 10/2013 |
| WO | WO2013163339 | 10/2013 |

OTHER PUBLICATIONS

PCT/US2010/047712 International Preliminary Report on Patentability and Written opinion dated Mar. 6, 2012.
PCT/US2010/047712 International Search Report dated May 30, 2011.
PCT/US2013/038055 International Search Report dated Aug. 23, 2013.
PCT/US2013/038055 IPRP dated Oct. 28, 2014.

* cited by examiner

ANIMAL MARKING DEVICES, TRANSFER ASSEMBLIES, AND USEFUL RESTRAINTS

CROSS-REFERENCE

This application is a U.S. National Phase Application of PCT/US10/47712, filed Sep. 2, 2010; which claims the benefit of U.S. provisional application Ser. No. 61/239,430, filed Sep. 2, 2009, all of which are incorporated by reference in their entirety.

TECHNICAL FIELD

The present disclosure relates to systems and methods for producing a identifying mark.

BACKGROUND

Animals have been marked for identification purposes for hundreds, if not thousands, of years. Animals are marked for identification in a variety of applications. Some animals are used for research and it is important to track which animal was exposed to a given set of experimental conditions. Some animals are used for breeding stock and it is useful to track which animals pass on desirable and undesirable traits to their offspring. Some animals are kept as pets and it is useful to identify animal ownership, animal type, licensing or need for special care. Some animals are used in competition and it is useful to identify animals to reduce animal substitution or other unfair competitive practices.

SUMMARY OF THE INVENTION

This invention provides an animal marking system comprising:
a restraining device, a controller, and a robot assembly wherein:
  a) the robot assembly comprises a robotic arm, a marking device attached thereto, and one or more actuators for manipulating the robotic arm and marking with the marking device;
  b) the robot assembly and the restraining device are positioned in a fixed manner relative to one another;
  c) the restraining device is sized and configured for restraining an animal or animal body part thereof and oriented such that the marking device can make a mark on a substrate portion of the animal body part;
  d) the controller is configured to control the position of the marking device and to make a mark on the substrate portion of the animal body part by actuating the one or more actuators; and
  e) optionally, the animal is a mouse, a rat, or a rodent;
  f) optionally, the body part is a tail.

In one embodiment, the marking device comprises a needle, bar, or stamp and optionally the marking system further comprises a media transfer assembly. The media transfer assembly comprises a marking media (hereinafter 'pigment'), where the marking device can make a mark by contacting the pigment and then contacting the substrate (e.g. mouse tail) to be marked.

In one embodiment, the media transfer assembly comprises a pigment and one or more layers or compartments (hereinafter 'layers'), such as a ply, where the pigment is affixed to or impregnated in at least a first layer. In another embodiment, the media transfer assembly further comprises a second layer wherein the first layer is distal to the second layer, relative to the substrate to be marked. In another embodiment, the second layer contains an adhesive on the side proximal to the substrate to be marked.

In one embodiment, the restraining device comprises a body part plate assembly, a body part cleat assembly, a body restraint, or combinations thereof.

Optionally, the body part plate assembly is configured for acceptance of a substrate portion of the body part (e.g. by providing one or more operation windows in a plate of the assembly). Optionally, a body part plate assembly comprises a guide for positioning the animal body part about the plate assembly. Optionally, the body part plate assembly comprises a biasing means for biasing the second plate to oppose the first plate and sandwich the animal body part.

In another embodiment, the restraining device is reversibly fixed in position with respect to the robot assembly, for example, by reversibly fixing restraining device components to a baseplate (e.g. using magnets) and/or reversibly fixing the baseplate in position with respect to the robot assembly (e.g. using a restraint dock).

In another embodiment, the one or more actuators for marking with the marking device are capable of actuating the marking device along the Y, theta, and R axes.

In yet another embodiment, a first actuator of the one or more actuators is a cyclical marking actuator.

In one embodiment, the animal is a rodent such as a mouse.
In one embodiment, the body part is a tail, cylindrical body part, or a conical body part.

In a further embodiment, a first actuator of the one or more actuators comprises a motor coupled to a piston, wherein the marking device is attached to the piston to provide a cyclically-actuated marking device. Optionally, the motor is a servo motor. Optionally the first actuator comprises a scotch yolk.

Any of the embodiments described above can be provided independently or in combination with one or more other embodiments described above. For example, each of the embodiments described above can be combined in a marking system. Further, any embodiment or optional technical feature taught herein can be combined with any other embodiment or optional feature taught herein (except where such a combination conflicts with the generals teachings of either embodiment or optional technical feature).

In one aspect, is a method of marking an animal, the method comprising a step of using the marking system taught here.

In another aspect, is a mark produced as taught here.
In another aspect, is an animal with a mark produced as taught here.

In another aspect, is a computer-readable medium comprising instructions for manipulating a robotic assembly to perform a function or method taught herein.

DETAILED DESCRIPTION OF THE INVENTION

Figure 1:
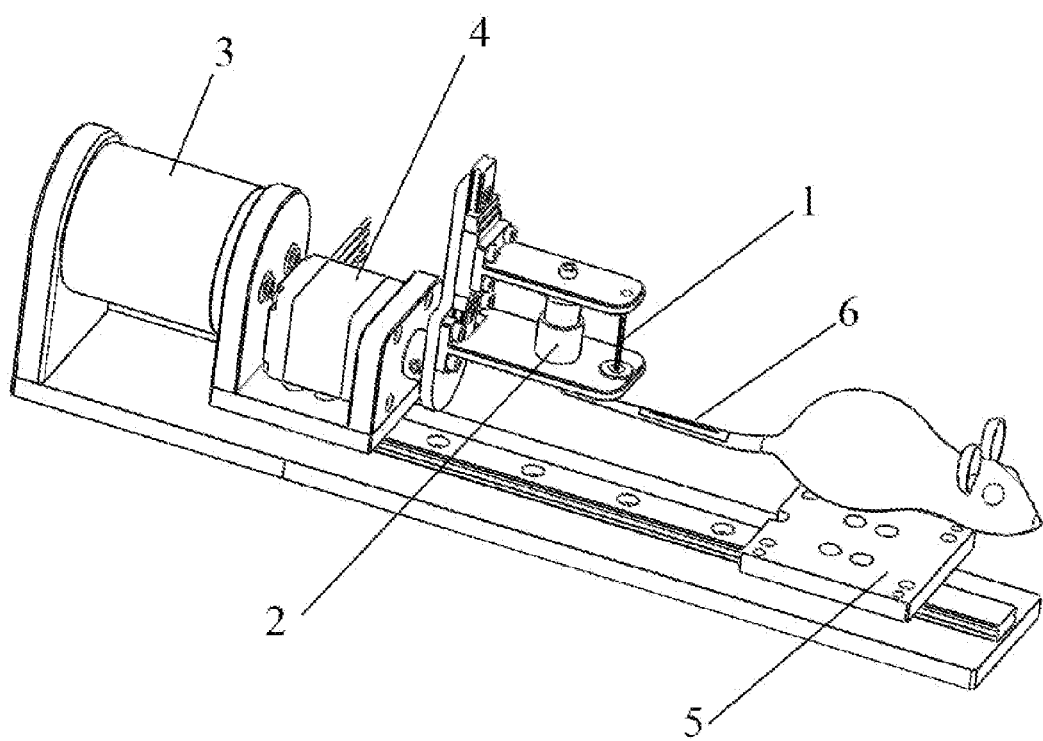
FIG. 1 depicts model 1.
Figure 2:
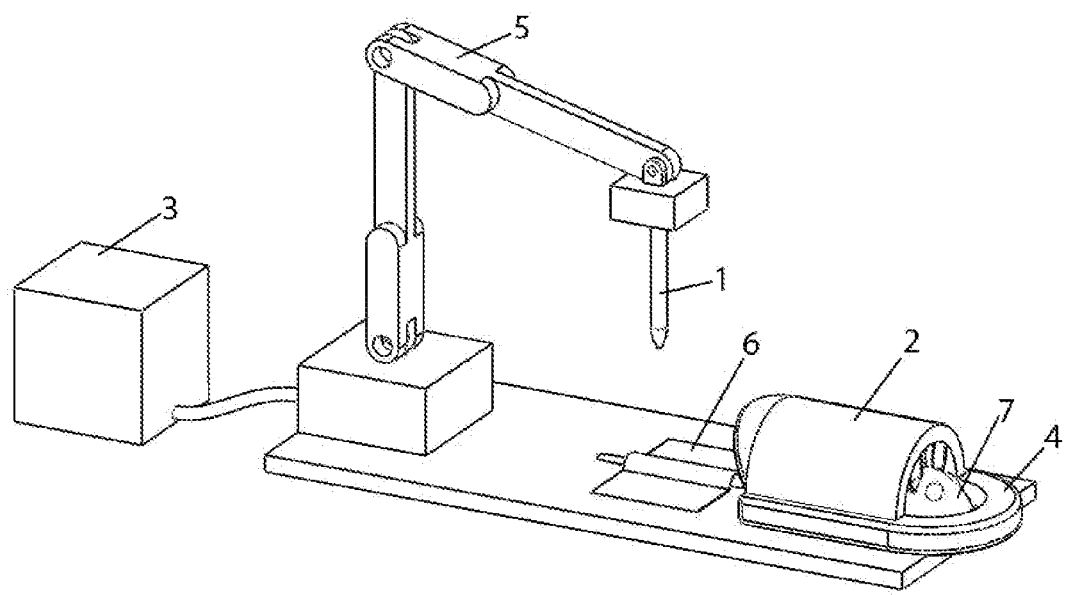
FIG. 2 depicts model 2.

As used here, the following definitions and abbreviations apply.

"Exemplary" (or "e.g." or "by example") means a non-limiting example. The term "exemplary" is not specifically intended to indicate a preferred example.

As described herein "bio-safe" means is substantially non-toxic to an animal when used in the disclosed manner. Determinants of toxicity are known in the art. Optionally, toxicity is determined with respect to one of: mortality, effect on overall health, disease state, perturbation of an animal's normal activities (upon acute and/or chronic exposure), and the like.

As described herein "body part restraint" means a restraining a device which immobilizes a body part of an animal. Optionally, a body part restraint immobilizes a substrate portion of an animal. For example, a body part restraint can immobilize a substrate portion of an animal by contacting the substrate portion itself, or contacting a different portion of the animal such that the substrate portion is immobilized.

As described herein "bio-permanent" means remains in or on an animal for a substantial duration of the animal's life.

As described herein "n±x %" means a range extending from [n−(x %×n)] to [n+(x %×n)]. Such a phrase is not intended to set forth error or precision in measurement.

As described herein "skin" means the external covering or integument of an animal body. In one embodiment, it includes subdermal cartilage and/or matrix.

The present disclosure provides a mark with one or more features. For example, the mark is durable, easily applied, relatively non-invasive, has a safety profile, low level of cross-read (e.g. less interference produced by other animals in proximity to each other), and read with a high level of accuracy (e.g. greater than about 80% or greater than about 90% or greater than about 95% accuracy).

The scope of the present invention is illustrated below with various examples, optional technical features, and generic teachings.

Restraining Device

A restraining device useful according to the present disclosure is any device that can restrain the body part of an animal to be marked. For example, in one embodiment the restraining device restrains the body part by restraining the entire animal, by restraining the body, by directly restraining (e.g. making contact with) the body part, or by having a first restraint useful for restraining the animal and a second part useful for restraining the body part to be marked. Useful restraining devices include restraining devices that do not kill or harm the animal. With the teachings provided herein, the skilled artisan can now design useful restraining devices by providing components of appropriate size and relative orientation to restrain a given animal or body part thereto.

In one embodiment, the restraining device comprises a tube, an array of form-fitting surfaces, a box, or an organic shape. In another embodiment, the restraining device comprises a clamp or an adhesive for restraining the body part to be marked.

In a further embodiment, the restraining device is fixed in place (e.g. relative to the robotic assembly) by magnets, levers, pins, gravity, springs, cams or other mechanical means. In yet a further embodiment, the restraining device fixed in place by vacuum, adhesive, or other means of adhering the restraining device to a support. For example, the restraining device can be reversibly fixed in position prior to use.

In one embodiment, the restraining device is comprised of a body restraint and one or more individual body part (e.g. a tail) restraints. For example, in one embodiment, the restraining device comprises a body restraint (e.g. a tube or other container which houses the trunk), and a body part restraint comprising a plate or pair of plates, such as a fixed plate and a spring loaded plate.

In another embodiment, the restraining device comprises one or more of a: vacuum, lever, spring, cam, cleat, ratchet, clamp, vice, or other mechanical means for restraining an animal body or body part.

In yet another embodiment, a restraining device (e.g. a body restraint and/or body part plates) comprises reversible fixing means to secure the restraining to a support (e.g. baseplate or table top). In a further embodiment, the reversible fixing means comprises one or more magnets (e.g. neodymium magnets), suction cups, adhesive, a latch, or other means. In one embodiment, reversible fixing means such as one or more magnets optionally provide one or more of the following properties: rapid loading and/or unloading of the animal or animal body part, accurate positioning of the restraint, reduced operator training, reduced user error, cleanability and ease of sterilization, longevity, and strong enough force to secure the body restraint without excessive manufacturing cost. In one embodiment, user acceptance of magnet-based fixable means is high, especially, for example, when the animal is a mouse, rodent, or other small animal or when the restraint components are otherwise small and/or positioned in close proximity to each other.

In a further embodiment, a restraining device comprises a body part restraint for restraining a body part having a substrate to be marked. Optionally, the body part is a tail, a cylindrical body part, or a conical body part. Although specific examples taught herein provide a tail as a body part, such examples are provided for illustrative purposes, and alternative body parts can be usefully restrained. Accordingly, the present invention provides a marking system or body restraint, wherein the body part of any embodiment taught herein is a tail, or wherein the body part is substituted for an alternative body part (e.g. a cylindrical body part, a conical body part, or any other body part.)

Body Part Cleat

Figure 8:
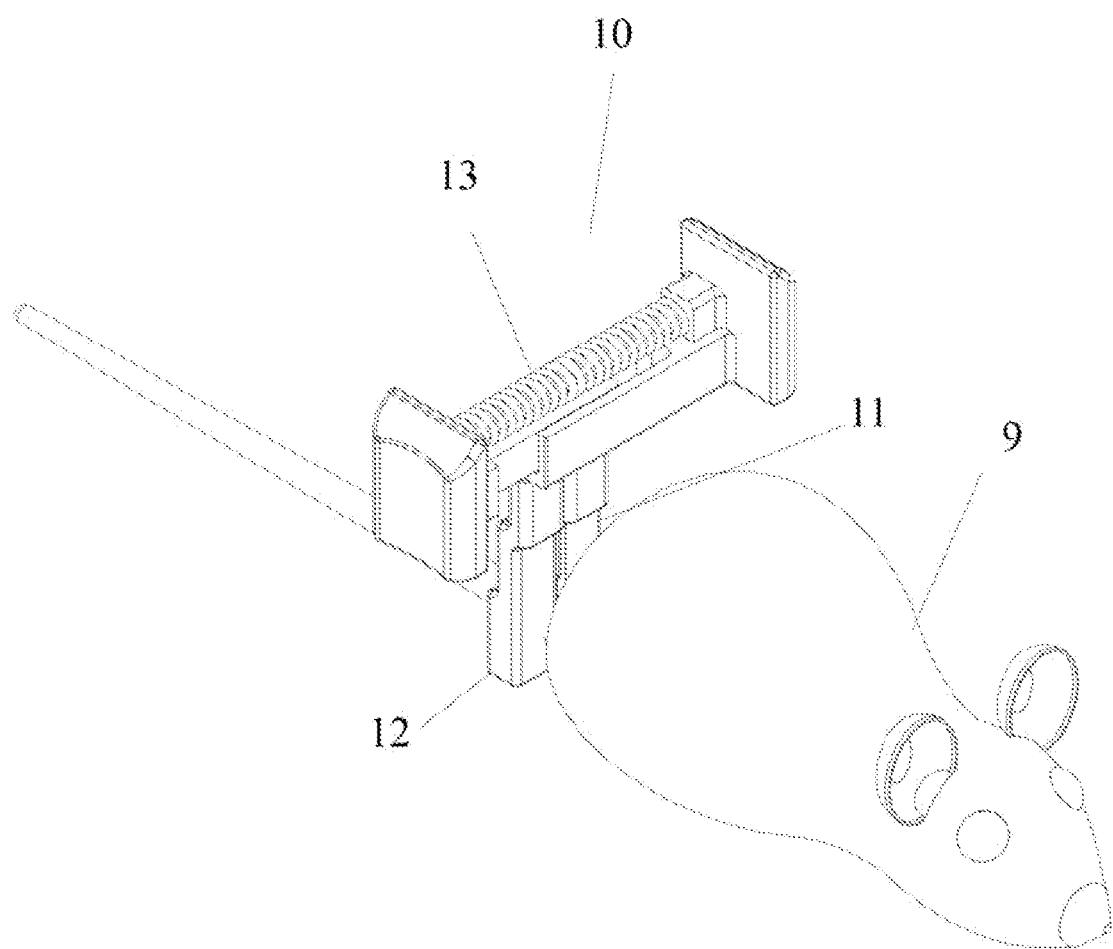
FIG. 8 depicts a restraining device.

In one embodiment, the restraining device comprises a body part cleat (also referred to as a "body part cleat assembly"). A body part cleat (e.g. tail cleat) is a body part restraint which prevents (minimizes or eliminates) movement of the restrained body part by creating friction (e.g. static friction) on the body part. Typically, a body part cleat comprises members which apply opposing forces to the body part, thereby preventing the body part from moving in a direction perpendicular to the opposing forces. Optionally, the opposing members are biased against each other, for example, by a spring or other means for biasing the opposing members against each other (e.g. magnets, rope, or screw). Optionally, the body part cleat (e.g. tail cleat) prevents longitudinal movement of the body, for example, movement along the Y axis, as depicted in Table 3 and FIG. 6. Such a body part in some embodiments prevents longitudinal movement by applying lateral force to the body part. Optionally, a body part cleat (e.g. tail cleat) is provided as cams, a clamp, a vice, and the like. Optionally, a body part cleat (e.g. tail cleat) is positioned or otherwise configured to contact the body part at a location proximal to the trunk of the animal (e.g. mouse), relative to a substrate portion of the body part. Optionally, a body part cleat further comprises teeth, adhesive, a rough surface, or other means to restrict movement of the body part. Examples of restraining devices comprising body part cleats are depicted in FIG. 7 and FIG. 8.

Useful body part cleats include, for example, friction-based mechanisms such as slide cleats, cam cleats, adhesive, nooses, strings, or slip-knots, and the like.

Useful body part cleats include those that are biased to oppose each other but that do not oppose each other with enough force to harm or seriously injure the body part (e.g. break bones).

Body Part Plates

In one embodiment, the restraining device comprises opposing members (e.g. a bottom and top plate), that sandwich or contain or hold in place a body part (e.g. tail) and prevent the body part from moving in a given direction by imposing a normal force or an applied force (hereinafter 'plates' or 'plate assembly').

Optionally, the body part plates are configured to accept a substrate portion of the body part (e.g. the portion of a tail receiving a mark). With the teachings provided herein, the skilled artisan can readily provide such a body part plate, for example, by considering the properties of the body part (or substrate portion thereof), such as the shape and size of the body part, the makeup of the body part, the muscular strength or propensity for movement of the body part, and/or the orientation or spacing of the body part from other body parts.

Optionally, the body part (e.g. tail) plate is provided with one or more substrate operation windows. For example, in one embodiment a marking device is configured to make a mark by moving a marking device through an operation window and contacting the substrate. Optionally, a body part plate comprises a plurality of windows, for example, each corresponding to a distinct character of a multi-character mark (i.e. character windows). In one embodiment, substrate portions of body parts (e.g. tails) can arcuate, bow, or distort, and the use of a marking window(s) in some embodiments prevents such a phenomenon. The skilled artisan will appreciate that a given "plate" need not be a solid member as long as it functions as a plate, as taught herein.

Optionally, the plate assembly comprises a guide (e.g. mechanical guide) for positioning the animal body part about the plate assembly. One or both plates may comprise a trough (e.g. one plate having a U shape or a radial groove and/or one plate having a V shape or v-groove), for example, to provide self-centering of a body part and/or self-leveling of the body part. Such a configuration can also be used, for example, to provide a second axis of applied force or normal force to the body part. Accordingly, in one embodiment the body part plates prevent movement along two (e.g. perpendicular) axes. With the teachings provided herein, the skilled artisan can now readily provide other examples of body part plates that prevent movement along two axes.

Optionally, a first plate is biased (e.g. by a spring) to sandwich a body part against a second plate for restraining the body part. For example, in one embodiment, the second plate is conformatively biased (e.g. by one or more springs or other elastic-biasing means) to oppose the first plates. Such a configuration can be used, for example, to provide a self-leveling body part plate. Useful biasing means include springs, a plurality of springs, a sponge, gel, foam, and rubber. Other useful biasing means include the use of a fluid, e.g. where the force is provided by gas pressure or buoyancy. A body part plate is configured for acceptance of a substrate portion of a body part (e.g. by providing one or more operation windows in a fixed plate), and a the first plate is biased to oppose the second plate with a force that does not cause substantial distortion of the body part (e.g. does not "push" the substrate up through an operation window).

In some embodiments, operation window(s), trough(s), and/or elastic or conformative-biasing means are incorporated independently or in concert as features of a body part plate (e.g. tail plate or other conical or cylindrical body part) to provide marking systems that produce marks that have one or more of the following properties: are crisp, clear, well-defined, precise, of high resolution, long-lasting, and/or safe to be received by the animal. In other embodiments, each of the features work independently or in concert to ensure proper proximity and/or orientation of a substrate (and subportions or even microportions thereof) to a robot arm or home position of a marking device, for example, to provide a consistent depth of penetration or other contacting of a marking device such as needle with a substrate. This property can be of paramount importance when the marking device must reach a specific depth to effectively mark a substrate. For example, for a mark such as an injectable tattoo to exhibit the properties discussed above, the pigment must be delivered to the dermis rather than the underlying vascularized layers or the overlying epidermal layers. Delivery of a pigment to the vascularized layers results in the pigment being carried away rather than being visible and can also endanger the animal or induce foreign contaminants that can prevent the animal from being used in laboratory experiments. Delivery of a pigment to the overlying epidermal layer also results in rapid clearance, for example, due to the action of the animal's immune system. The thickness of the substrate dermal layer of animals (e.g. mice or other rodents) and animal body parts (e.g. tails) is less than a fraction of a millimeter. Accordingly, described herein is a marking system which makes marks using a robot assembly, given the properties of animal body parts (e.g. tails), such as their propensity for distortion, movement by the animal, and/or irregular (e.g. conical) shape.

Examples of such a restraining device are taught herein. Optionally, the restraining device comprises self-centering and leveling tail or other body part plates. (e.g. by the use of grooves and elastic or conformative biasing means).

Body Restraint

In one embodiment, the restraining device comprises a body restraint. A body restraint can be any restraint that restricts movement of the animal. For example, in one embodiment, a body restraint restricts the lateral movement of the animal's trunk, longitudinal movement of the animal's trunk, locomotive movement (e.g. walking), pivotal movement (e.g. pivoting about the hind legs), rotational movement, swiveling of the head, and combinations thereof.

In one embodiment, a body restraint is configured in any manner which restrains the body of the animal. For example, in one embodiment a body restraint comprises a tube, a container, or other housing for acceptance of the trunk, head, or combination thereof. Optionally, a housing provides an enclosure that is small enough to restrict gross movement of the animal but is large enough to avoid subjecting the animal's body to excessive force or constant contact with the body restraint and/or allow ease of loading. Alternatively, a body restraint can comprise one or more restraints that contact (e.g. sandwich) one or more points (e.g. a plurality of appendages such as four legs) of the animal, thereby restricting movement of the animal.

In one embodiment, a body restraint comprises a housing which substantially encloses the trunk, head, or combination thereof. Optionally, the housing encloses at least the head, wherein the housing is opaque to the animal. Optionally, the body restraint encloses at least the head and is tinted to inhibit penetration of light in the visible-light spectrum of the animal. Optionally, the housing is opaque to the animal but transparent to a human. For example, a housing can be tinted red to provide an opaque housing to the eye's of a mouse or other animal while providing a transparent housing to a human user, thereby allowing the user to view the animal. Such housing provides a calming effect to the animal. Other color tints include amber-colored tints.

In one embodiment, a body restraint comprises reversible fixing means to secure the body restraint to a support (e.g. baseplate or table top). Optionally, the reversible fixing means comprises one or more magnets (e.g. neodymium magnets), suction cups, adhesive, a latch, or other means.

A body restraint of the present invention is in some embodiments useful for a number of reasons. For example, some embodiments of the present invention provide a body restraint (e.g. enclosed body restraint) that prevents the animal from pivoting about a restrained body part (e.g. tail) and/or swiveling its head in an attempt to remove a restrained body or from itself (e.g. by biting) or from a body part restraint (e.g. by contorting). In one embodiment, a restrained animal can attempt such a maneuver, for example, in a fight or flight response upon being restrained in a body part restraint (e.g. tail cleat) and/or receiving a mark from the marking device.

In one embodiment, the restraining device comprises a magnetically connected modular body restraint (e.g. to connect a baseplate and body restraint). In one embodiment, this allows for easy cleaning of the restraint area, and quicker in/out times for the animal.

Baseplate

Restraining devices described herein are optionally supported by a baseplate.

Optionally, the baseplate comprises a means for reversibly fixing a body restraints and/or one or more body part restraints to the baseplate (e.g. magnets), for example, to operatively position the restraint(s). Optionally, a baseplate comprises one or more magnets which are positioned in a pattern to interact with a respective pattern of one or more magnets of a restraining device (e.g. body restraint and/or body part restraint).

Optionally, the baseplate comprises one or more indexing members (e.g. lip, peg, guide) to allow the user to properly position a restraint. Such an indexing member is especially useful in combination with reversible fixing means such as magnets in order allow the user to place the restraint in the approximate position such that the attractive forces of the magnets self-positions the restraint.

Optionally, the baseplate comprises a graspable member so that the user (e.g. human user or a robot) can manipulate the baseplate. For example, the baseplate can comprise a handle.

Optionally, the baseplate comprises a debris collection area for collecting debris from an animal. Examples of debris collection areas include a trough, a depression, a drain hole, an absorbent material, and the like. Debris collection areas are useful, for example, to concentrate urine, feces, and other debris, for easy of cleaning and/or sample collection/analysis.

Optionally, the baseplate comprises a member to protect loose articles (e.g. body parts), for example, from getting caught in a motor or other moving part. The member can be a guide, shield, or other means for diverting a loose article (e.g. body part) way from moving parts. For example, a baseplate can have a port to guide or divert the end of a body part (e.g. tail) under the base plate, and can optionally further comprise a lip on the under-side of the base plate to shield the body part.

Figure 20:
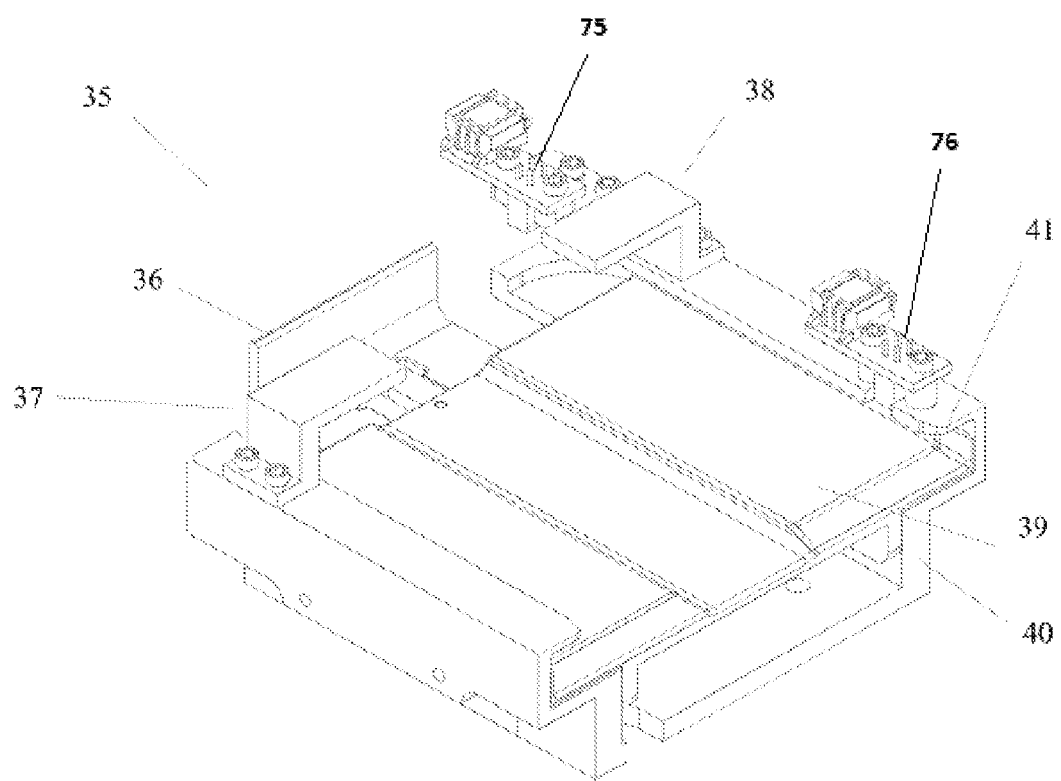
FIG. 20 depicts a restraint dock.

Optionally, the baseplate is fixed in position with respect to the robot assembly such that the substrate portion of the animal is properly presented to a robot assembly, e.g. such that the robot assembly and the restraining device are positioned in a fixed manner relative to one another. Optionally, the baseplate is reversibly fixed in position with respect to the robot assembly. For example, a marking system can comprise a restraint dock (e.g. as depicted in FIG. 20), wherein the restraint dock and the robot assembly are positioned in a fixed manner relative to one another; and the restraint dock is configured to accept the baseplate. A reversibly fixed baseplate provides one or more of the following advantages: rapid and accurate positioning of the animal in the marking system, ease of restraining device loading without interference from the robot assembly and/or other system components, and the use of multiple baseplates such that a first animal can be marked while a second an animal can be loaded into a restraining device, and the use of multiple baseplates for different restraint configurations, such as for different animal species or sizes and/or different body part substrates.

Optionally, a restraint dock comprises more vertical (or Z axis) stops to orient a base plate and supported animal restraint in the proper vertical (or Z axis) position relative to the robot assembly, one or more longitudinal (or Y axis) stops to orient a base plate and supported animal restraint in the proper longitudinal (or Y axis) position relative to the robot assembly, and one or more lateral guides to orient a base plate and supported animal restraint in the proper lateral (or X and/or Z axis) position relative to the robot assembly.

Restraint Combinations

In a further embodiment a restraining device optionally comprises one or more of: a body restraint, body part cleats, and body part plates. A restraining device in another embodiment comprises each of these restraints, a single restraint, or a combination of restraints.

One embodiment provides a restraining device comprising a body part (e.g. tail) plate assembly and a body part (e.g. tail) cleat assembly (e.g. sliding cleat or other cleat assembly). Optionally, the body part plate assembly comprises laterally opposing plates (e.g. plates opposing each other about the Z axis) and the body part cleat assembly comprises laterally opposing cleats (e.g. cleats opposing each other about the Z or X axis), wherein the body part plate assembly and the body part cleat assembly are disposed longitudinally with respect to each other. Optionally, the laterally opposing body part plates oppose each other about the Z (or vertical) axis and/or a first plate of the plate assembly comprises one or more (e.g. 3) substrate operation windows (e.g. disposed longitudinally from each other). Optionally, the first and/or second plates comprise a trough to self-center the body part. Optionally, the trough of the first plate is radial groove and/or the trough of the second plate is a v-groove such as a tapered v-groove (e.g. tapered away from the cleat assembly). Optionally, the cleat assembly is proximal to the body of the animal relative to the plate assembly. Optionally, the body part plates oppose each other with substantially less force than do the body part cleats. For example, the second plate can be conformatively biased (e.g. by one or more springs) to oppose the first plate. In one embodiment, such a configuration provides one or more of the following properties:

restricts longitudinal movement and lateral movement of the body part without substantially distorting the substrate portion thereof;

properly orients the substrate portion of the body part while allowing marks to be made with high precision;

restricts longitudinal movement of the body part without stressing or damaging the substrate portion thereof; or restrains at least a portion of the body part on which oil need not be applied.

Such a restraining device can be provided as the restraining device in any embodiment taught herein (except where it conflicts with the express teachings of the embodiment). Although the invention contemplates a marking system comprising the restraining device, the invention also contemplates the restraining device outside of a marking system (e.g. as a stand-alone product). Non-limiting examples of such a device are depicted in FIG. 12, FIG. 13, FIG. 14, and FIG. 15. Accordingly, such a device can further comprise additional components, for example, a baseplate, a means for acceptance of media transfer assembly (e.g. a slot and/or indexing members), and/or a body restraint.

One embodiment described herein provides a restraining device comprising a body restraint and a body part (e.g. tail) cleat assembly (e.g. sliding cleat assembly or cam cleat assembly). Optionally, the body restraint and the body part cleat are fixed to each other to provide a single unit. Optionally, the body part cleat assembly is juxtaposed to the body restraint such that the body part cleats contact a body part at location proximal to the animal's trunk. Optionally, the body restraint comprises an enclosed housing as taught herein (e.g. a domed or concaved housing). Optionally, the housing provides an enclosure that is small enough to restrict gross movement of the animal but is large enough to avoid subjecting the animal's body to excessive force or constant contact with the body restraint and/or allow ease of loading. Optionally, the housing is opaque to the animal. Optionally, the housing is transparent to a human. Optionally, the housing is opaque to an animal and transparent to a human. Optionally, the housing is tinted (e.g. tinted red). Optionally, the body restraint comprises reversible fixing means to secure the body restraint to a support (e.g. baseplate or table top), for example, one or more magnets (e.g. neodymium magnets), suction cups, or adhesive. In one embodiment, such a device optionally provides one or more of the following properties:

restricts movement of the body while presenting the tail to a user or marking device;

allows rapid restraint of one or more animals, for example, using a single restraining motion for each animal;

allows restraint of an animal using a single hand;

allows rapid release of the animal, for example, using a single hand allows the user to restrain one or more animals without transferring the animal(s) to a different surface;

allows restraint of an animal on a sterile (e.g. stainless steel) surface; or allows visualization of a restrained animal while the animal perceives an opaque surrounding.

Examples of restraining device components include, but are not limited to, the components listed in Table 1.

TABLE 1

Example Restraints

| | Restraint Component | Example for Mouse Tail Marking |
|---|---|---|
| 1 | Baseplate | Baseplate for Mouse |
| 2 | Body restraint | Body Restraint for Mouse |
| 3 | Spring loaded body part plate | Spring-loaded Tail Plate |
| 4 | break-away kickplate | Break-Away Kickplate |
| 5 | Fixed body part plate | Fixed Tail Plate |
| 6 | Operation Window | Operation Windows |
| 7 | Media transfer assembly | Disposable Marking Medium Container |
| 8 | Body part cleat | Tail Cleats |

Although the present invention contemplates a restraining device comprising each of the components listed in Table 1, a restraining device can comprise one, all, or less than all of the components. For example, as set forth in Table 1, the restraining device can comprise a spring loaded body part plate, a fixed body part plate, a body part cleat, and a body restraint. Also as set forth in Table 1, the restraining device can comprise a spring loaded body part plate, a fixed body part plate and a body part cleat. In optional embodiments, the body part is a tail (e.g. mouse tail).

Table 2 lists components of several optional embodiments (note that the part numbers correspond to those listed in Table 1).

TABLE 2

Example Restraint Combinations

| A: | 1, 2, and body part restraint (e.g. 3 + 5) |
|---|---|
| B: | 1, 2, 3, 5 |
| C: | 1, 2, body part restraint, 4, |
| D: | 1, 2, body part restraint, 4, 8 |
| E: | 1, 4, body part restraint |
| F: | 1, 2, body part restraint, 7 |

Robot Assembly

The robot assembly is any robot assembly that comprises a robotic arm having a marking device attached thereto, and one or more actuators for marking with the marking device and optionally for positioning the marking device. In one embodiment, the robotic arm is manipulated by a controller to position an attached marking device about the substrate to be marked.

Robotic Arm

In one embodiment, the robotic arm described herein is meant to embrace any robotic configuration that allows positioning of the marking device about the substrate, whereby actuation of the marking device (or marking member thereof) marks the substrate. In another embodiment, a robotic arm positions the marking device along a y-axis and an R axis. In a further embodiment, the robotic arm operates or controls operation of the marking device, for example, by actuating a marking member to mark the substrate.

In one embodiment, the robotic arm positions the marking device along a Y-axis, a theta axis, and along an R axis.

The robotic arm (in combination with one or more actuators) can be configured to position a marking device along any axis. For example, in one embodiment, the robotic arm can position the marking device along a linear axes (e.g. Y and/or R), rotational axes (e.g. theta), or a combination thereof. With the teachings provided herein, the skilled artisan can readily produce robot assemblies that enable a marking device to move about a desired axis. For example, in one embodiment, a marking device moves about a linear axis by providing a linear track or can move about any other axis (e.g. rotational axis) by providing a track that follows the desired axis. As another example, in one embodiment, a marking device moves about a rotational axis by providing a radial arm (e.g. an arm that extends from a pivot point). As another example, in one embodiment, a marking device moves about a linear axis by providing a piston coupled to a crank pin. As another example, in one embodiment, a marking device moves about a linear axis by providing a rack and pinion mechanism (where the marking device is attached to a linear rack portion). As another example, in one embodiment, a marking device moves about a non-circular curved axis by providing a rack and pinion mechanism (where the marking device is attached to the rack portion and the rack/pinion combination is configured therefore). As another example, in one embodiment, a marking device moves about a rotational axis by providing a rack and pinion mechanism (where the marking device is attached to a circular pinion portion or where the marking device is attached to the rack portion and the rack portion is a circular shape). As another example, in one embodiment, a marking device moves about a curved axis by providing a crank-slider mechanism (where the slider is a pivoting slider).

In one embodiment, the robotic arm positions the marking device along 2 or more (e.g. 2 or 3) of the axes listed in Table 3.

Marking Device

In one embodiment a marking device described herein is any device that can make a mark, for example, by heat branding, freeze branding, ablation, bleaching, tattooing, staining, chemical staining, injecting, printing, spraying, painting, stenciling, stamping, scratching, etching, dying, sewing, and the like.

A marking device can be any device comprising one or more marking member and a means for coupling the marking member(s) to the robotic arm.

Examples of useful marking members include pens, needles, dies, injectors, stamps, syringes, blades, film, sticker, sprayer, brush, or other marking member. Other marking devices include a branding iron or a laser.

In a further embodiment, a needle is a solid needle or hollow-shaft cannula. In yet a further embodiment, a needle comprises a pointed tip or a flat tip on an end proximal to the substrate to be marked. In yet a further embodiment, a solid needle comprises a tip having a cavity on an end proximal to the substrate to be marked.

In yet another embodiment a marking device comprises a heating element, for example, for heating one or more branding irons. In another embodiment, the heat is supplied by any means; e.g. by an electrical or chemical means.

A marking device in another embodiment comprises a needle jet injector.

A marking device in another embodiment comprises a marking member that can transfer a pigment from a media transfer assembly to discrete areas of the substrate. For example, it can be a cutting edge, an abrasive surface, an injector shaft, or any transfer surface.

In one embodiment, the marking device contains a plurality of marking device components housed in more than one [sub] assembly. For example, the marking device can comprise a disposable or replaceable ("cartridge") assembly comprising one or more marking members and a reusable assembly means for coupling the cartridge and/or one or more marking members to the robotic arm. Optionally, the cartridge houses pattern-defining elements (e.g. marking members) such as injector shaft(s) and the reusable assembly houses an actuator and/or a reservoir containing pigment.

Useful marking devices can produce a mark with well defined perimeters, e.g. sharp and clear marks.

Unexpectedly, solid needles optionally require substantially less cleaning time for sterilization and have more longevity than hollow needles, especially when the marking device is configured for marking small or delicate substrates, such the skin of a mouse.

When a marking device comprises more than one marking member (or where a plurality of marking members are used), the marking device or plurality of marking devices as a whole can be actuated for marking a substrate or each marking member or marking device can be actuated independently of each other. Further, such marking members or marking devices can be oriented in any desired pattern. For example, in one embodiment, marking members are distributed over a desired axis a planar, spherical, linear, circular arced, or non-circular arced axis, whether or not the marking device can move about the axis. Providing such a pattern of marking members as a pattern of independently-actuated marking members (e.g. needles) allows the marking device as a whole to emulate positioning (movement) along a given axis. Accordingly, the present disclosure provides an alternative embodiment to any embodiment taught herein, wherein a given robot arm actuator is substituted with a marking device comprising a corresponding pattern of independently-actuated marking members. For example, a theta actuator can optionally be substituted with a marking device comprising a plurality of independently-actuated marking members which are patterned along the inside of a circular arc or other arc (e.g. as radial pattern of inwardly-extending needles). As another example, in one embodiment, a Y actuator is substituted with a marking device comprising a plurality of independently-actuated marking members which are patterned in a linear manner. With the teachings provided herein, the skilled artisan can now provide such substitutions.

Actuators

The robotic assembly comprises at least a first actuator (also referred to herein as a 'marking actuator') that causes the marking device to make a mark on the substrate, i.e. that 'actuates for making a mark', as used herein. The robotic assembly in one embodiment, further comprises one or more additional actuators for positioning the robotic arm (and marking device) on or about the substrate prior to making a mark on the substrate and/or homing or otherwise disengaging the marking device thereafter.

In one embodiment, the actuator(s) are any type of actuator, for example, a motor, voice coil, screw, piezoelectric device, solenoid, or pneumatic pump. Useful motors include, for example, stepper motors and servo motors.

An actuator in one embodiment, is for example, a linear actuator (e.g. Y axis actuator), a rotational actuator (e.g. theta axis actuator), or an actuator that converts from rotational to linear motion or vice-versa (e.g. of the piston type). An actuator (e.g. marking actuator) can cause a robotic arm or marking device thereof to move in a constant motion or a reciprocating motion.

An actuator (e.g. motor) is optionally controlled by a feedback mechanism, for example, a feedback mechanism that provides positional information of the robotic arm or marking device thereof.

Optionally, a feedback mechanism is external to the actuator and comprises a flag fixed to a robotic arm or marking device and a sensor fixed in position with respect to a restraining device (or vice-versa). For example, one or more flags can be provided for each axis of movement such that the marking device can be properly positioned. Optionally, the robot assembly comprises a "substrate" flag (or multiple substrate window flags) on a robotic arm (e.g. an arm actuated by a second actuator), wherein the substrate flag is positioned such that the flag detected by a sensor when the robotic arm has positioned marking device about the substrate (in position for marking). A marking actuator (first actuator) can then be actuated to make a mark (e.g. controlled by a servo motor coupled to a marking device by a reciprocating piston).

Optionally, a feedback mechanism is internal to the actuator. For example, in one embodiment a servo motor is used to provide an actuator (e.g. a first actuator). Generally, a servo motor includes a motor, a feedback device, and a drive. The motor operates on direct current, and is typically hotter and smaller than other motors producing a comparable amount of torque. The feedback device is often an encoder or resolver (e.g. 32 count encoder) mounted on the back of the motor, and the feedback device reports performance information such as motor position and motor speed back to the drive. The servo motor's drive provides current to the motor, and the drive can include a programmable control device (e.g., a controller) which dictates the current in response to the feedback from the feedback device. A servo motor can be controlled by an algorithm such as the proportional-integral-derivative (PID) algorithm. In one embodiment, a servo motor provides properties when used in an actuator (e.g. coupled to a marking device through a reciprocating piston such as a scotch yolk assembly). Examples of such properties are detailed in Example 20.

Among other various properties taught herein, a servo motor can optionally be provided as a marking actuator to impart a marking system with the ability to stop the marking device's motion at a position that reduces the amount of motion needed by the robotic arm to change positions. For example, a marking device can be fixed to a piston which is coupled to servo motor for reciprocating up/down "marking" motion of the marking device, and the servo motor can be operated with such precision that the needle can stop cyclical movement at top dead center (e.g. upon completion of a mark or a character thereof). This feature eliminates the possibility of dragging the marking device (e.g. needle) on the marking surface without the use of global upward (or Z-axis) movement of the robotic arm itself (e.g. by a second actuator).

Figure 6:
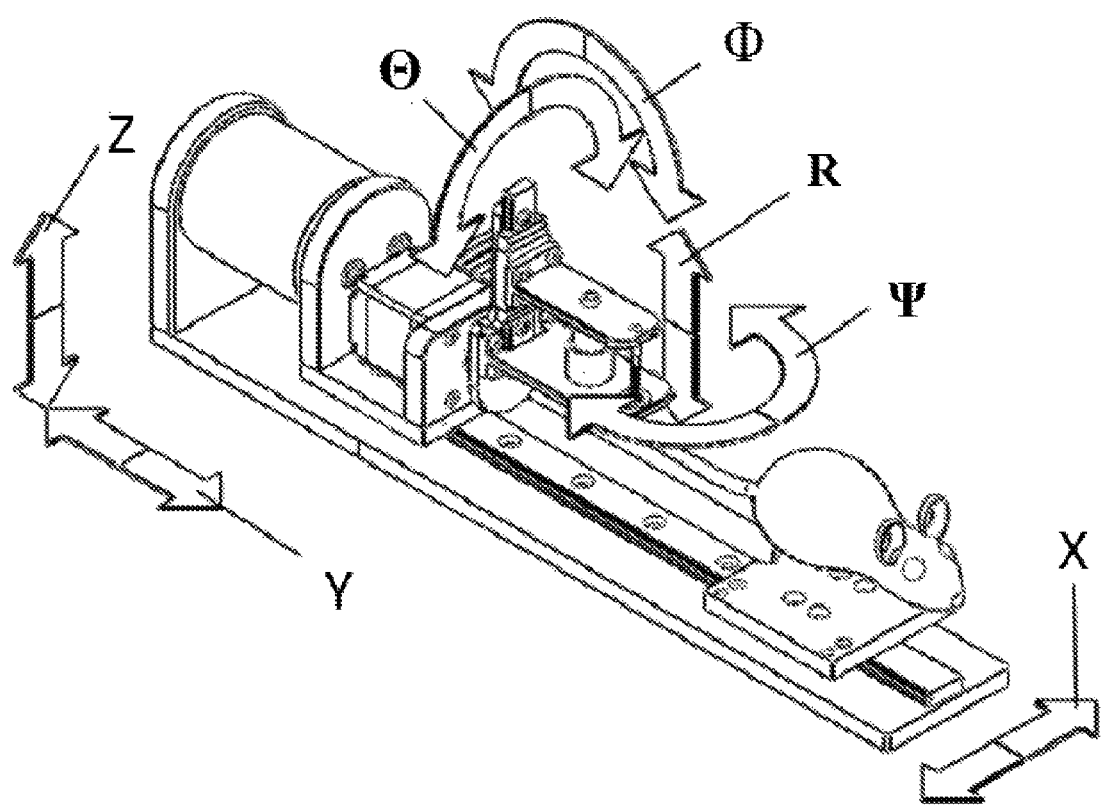
FIG. 6 depicts examples of optional axes about which the marking device and/or robotic arm can be configured to move.
Figure 7A:
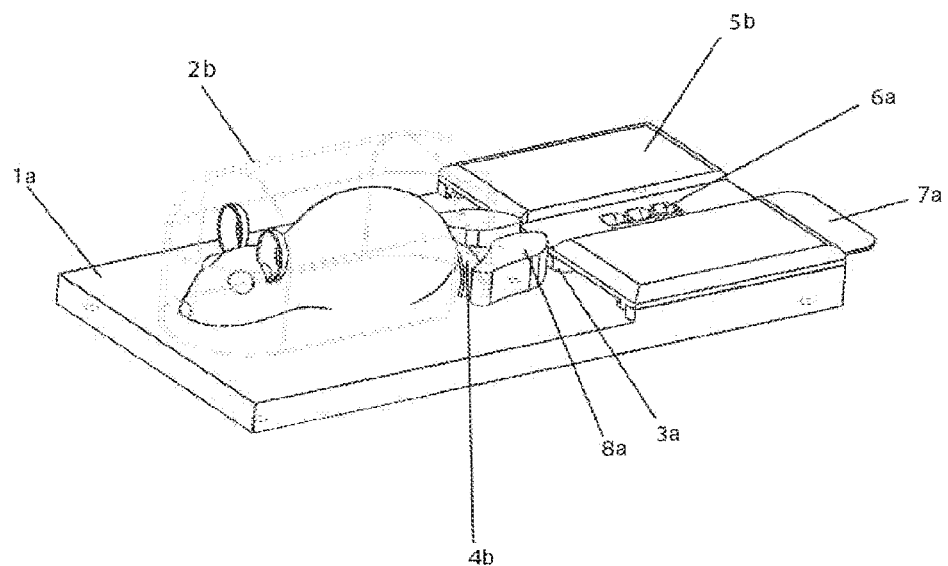
FIG. 7 depicts a restraining device.
Figure 7B:
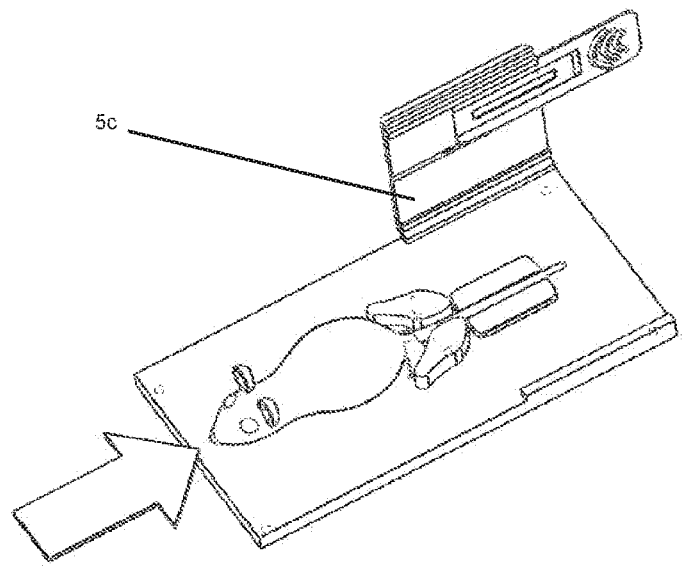
Figure 7C:
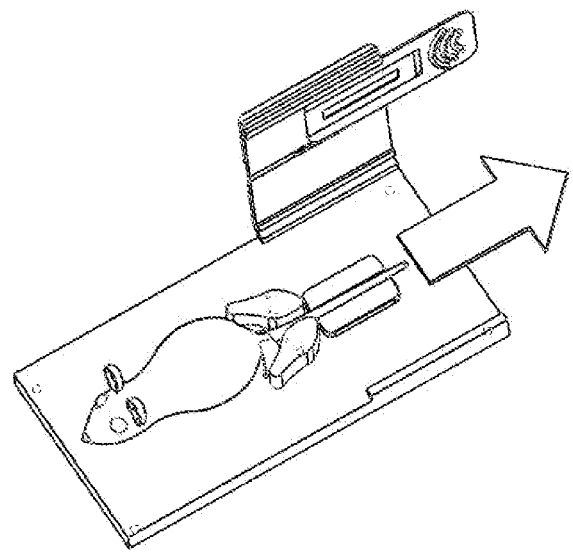
Figure 7D:
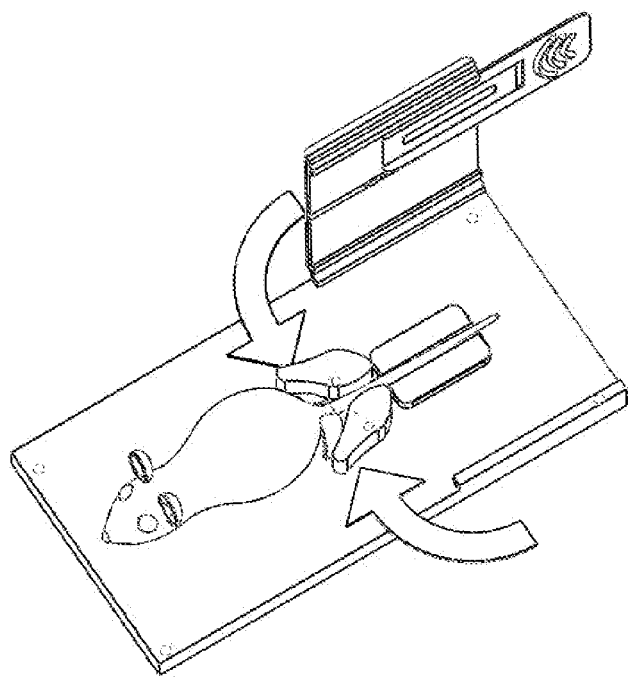

In one embodiment the actuator for marking a substrate actuates the marking device, and optionally, the robotic arm along one or more axes or around or about one or more points in space. Optional axes include linear axes and rotational axes, as depicted in FIG. 6. For example, Table 3 lists optional axes about which the marking device and/or robotic arm can be configured to move, as depicted in FIG. 6 depicts (note that the R axis is defined relative to Theta and Phi and is parallel with the Z axis when Theta and Phi are both equal to zero). Although not depicted in the figure, other optional axes include those that are defined relative to (e.g. normal to) theta and psi or psi and phi.

TABLE 3

Movement Axes

| Axis | Corresponding Label in Table 4 |
|---|---|
| Y | 1 |
| Z | 2 |
| X | 3 |
| Θ (Theta) | 4 |
| Φ (Phi) | 5 |
| Ψ (Psi) | 6 |
| R | 7 |

The skilled artisan will recognize that certain exemplary axes are defined relative to each other in robotic assemblies of marking systems taught herein. For example, although certain descriptions and figures set forth the Z axis as the vertical axis, the skilled artisan will appreciate that this is done to illustrate the invention.

In one embodiment, an actuator actuates movement along a single axis. In another embodiment, an actuator actuates movement along a plurality of axes. Optionally, the marking device and/or robotic arm is capable of moving on plurality of axes, wherein movement along each of a plurality of axes is controlled be a different actuator.

Although the invention contemplates a marking system in which the marking device and/or robotic arm is capable of moving on one, all, or less than all of the axes defined by Table 3 and FIG. 6 (e.g. independent of other axes), Table 4 provides example sets of axes about which the marking device can be actuated. In such embodiments, the marking device can be actuated for making a mark by an actuator that does not move the robotic arm, i.e. does not move the robotic arm other than the marking device (e.g. by placing the actuator between the arm and the marking device), for example, for providing precision movement of the marking device and/or reduced wear on the actuator compared to an actuator that moves both the marking device and robotic arm simultaneously.

TABLE 4

Example Combinations of Movement Axes

| A: | 1, 2, 3, 4, 7 |
|---|---|
| B: | 1, 4, 7 |
| C: | 1, 2, 4 |
| D: | 1, 2, 4, 5 |
| E: | 1, 3, 4, 7 |
| F: | 1, 4, 5, 6 |
| G: | 1, 4, 5, 6, 7 |

Useful robot assemblies of the present invention can an actuator that causes a marking member (of a marking device) to contact the substrate. Optionally, the actuator causes a marking member to pierce the substrate (e.g. to inject a tattoo). Optionally, the actuator causes the marking member to move in a reciprocating (or 'cyclical') motion, for example, by providing a motor coupled to a marking device by a piston. For example, where the mark is produced by one or more needles piercing the skin of the animal to be marked, the needle can enter the skin and exit the skin along the same path, for example, by retracting from the skin, minimizing spread of the mark and tissue damage.

Figure 25:
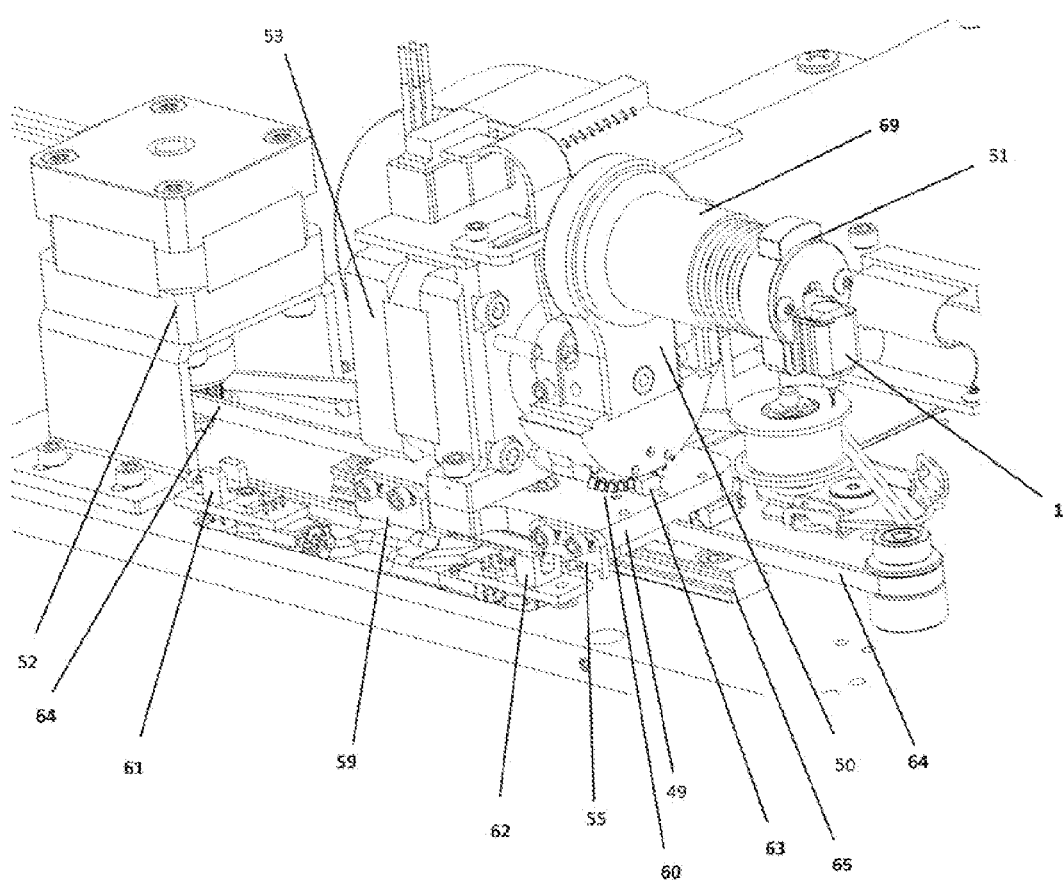
FIG. 25 depicts a robot assembly.

In one embodiment, the robotic assembly comprises at least a first actuator that actuates the marking device for marking a mark (e.g. R or Z axis), and further comprises at least a second actuator (e.g. X, Y, Z, Phi, or theta axis) for positioning the robotic arm (and marking device). Optionally, the first actuator(s) is/are connected between the robotic arm and the marking device. This configuration allows more rapid placement of the marking device (i.e. position and angle with respect to the body part to be marked), more accurate and discrete marking, and/or less wear on the marking actuator (e.g. as depicted in FIG. 1 and FIG. 25). Such a robot assembly is optionally combined in a marking system with a body part restraint, such as a body part plate assembly. For example, such a robot assembly is useful in combination with body part (e.g. tail) plate assembly with conformative biasing means and/or one or more operation windows.

In one embodiment, the robotic assembly comprises at least a first actuator (e.g. reciprocating piston coupled to a motor such as a servo motor) that actuates the marking device for marking a mark (e.g. R or Z axis), and further comprises at least a second actuator (e.g. X or theta axis) and at least a third actuator (e.g. Y or Phi) for positioning the robotic arm (and marking device). Optionally, the first actuator(s) is/are connected between the robotic arm and the marking device, (e.g. as depicted in FIG. 1 and FIG. 25). For example, the first actuator(s) can be actuated (e.g. cyclically actuated) for making a mark and the second and third actuators can be manipulated during a method of making a mark in order to make a make with a desired shape, pattern, character, or set of characters. Such a robot assembly is optionally combined in a marking system with a body part restraint, such as a body part plate assembly. For example, such a robot assembly is useful in combination with body part (e.g. tail) plate assembly with conformative biasing means and/or one or more operation windows.

In yet another embodiment, the robot assembly comprises first and second actuators and the first actuator(s) actuates the marking device along the R or Z axis. In a further embodiment, the first actuator comprises a servo motor (e.g. PID controlled) coupled to a piston (e.g. scotch yolk).

In yet another embodiment, the robot assembly comprises first and second actuators and the first actuator(s) actuates the marking device along the X, Y, Z, or theta axis.

In one embodiment, the robot assembly comprises first and second actuators and the first actuator(s) actuates the marking device along the R or Z axis and the second actuator(s) actuates the marking device (and robotic arm) along the X, Y, Z, Phi, or theta axis. For example, the first actuator can actuate the marking device for making a mark along the R axis and the second device can actuator the marking device along the theta axis. Optionally, the first actuator comprises a servo motor (e.g. PID controlled) coupled to a piston (e.g. scotch yolk).

In one embodiment, the robot assembly comprises first and second actuators and the first actuator(s) actuates the marking device along the X, Y, Z, or theta axis and the second actuator actuate(s) the marking device along the X, Y, Z, or theta axis.

In one embodiment, the robot assembly comprises first, second, and third actuators and the first actuator(s) actuates the marking device along the R or Z axis, the second actuator(s) actuates the marking device (and robotic arm) along the X or theta axis, and the third actuator(s) actuates the marking device (and robotic arm) along the Y or Phi axis. Optionally, the first actuator comprises a servo motor (e.g. PID controlled) coupled to a piston (e.g. scotch yolk).

In one embodiment, the marking device is actuated by the first actuator (e.g. along the R, X, Y, Z, or theta axis) for positioning the marking device about (e.g. flush with) the substrate (e.g. skin or dermis), and then cyclically actuated (e.g. back and forth along R, X, Y, Z, or theta axis) to contact the substrate one or more times (e.g. repeatedly contacting or piercing into the substrate). Optionally, the first actuator comprises a servo motor (e.g. PID controlled) coupled to a marking device through a piston (e.g. scotch yolk).

In one embodiment, the actuator(s) of the robot assembly are configured to make a mark on a cylindrical or conical substrate. With the teachings provided herein, one skilled in the art can now provide such a configuration. For example a mark can be made on such a substrate by providing an actuator that actuates a marking device about a rotational axis (e.g. theta axis). As another example, a mark can be made on such a substrate by providing a plurality of independently-actuated marking members (e.g. needles) that are patterned about the inside of a circular arc or other arc.

Controller

In one embodiment, the controller described herein is any controller that is able to control the position/movement of the robotic arm relative to the robot assembly and/or for actuating the marking device, for example a computer or microprocessor, or computer-interfacing device.

The present invention contemplates a computer program (e.g. recorded on a computer readable medium) comprising instructions for manipulating a robotic assembly to perform a function or method taught herein.

The controller manipulates the robotic assembly to position the marking device about the substrate and mark the substrate. Optionally, the controller manipulates the robotic assembly to make predetermined marks, for example, of predetermined shape, position, position, size, and/or angle. The controller can determine the position of substrate by existing instructions, user input, or by use of an indexing device that informs the controller of the substrate's position. Optionally, an indexing device is fixed relative to the restraining device. Optionally, the restraining device comprises the indexing device. Optionally, the indexing device comprises optics, for example, as described in US 2008/0247637, which is hereby incorporated by reference.

In one embodiment, the controller is contains a program that is responsive to one or more feedback mechanisms (e.g. sensors).

In another embodiment, the controller contains an algorithm such as PID to control one or more servo-based actuators (e.g. marking actuators).

With the teachings provided herein, the skilled artisan can now provide a controller that can manipulate a robotic arm and/or marking device according to the present invention.

Readable Mark

In one embodiment, a readable mark is any distinguishable mark. For example, it can be a number, letter, barcode, pattern(s), other symbol marking or any other distinguishable image. It can also be a binary code, e.g. such as Code 128, as is known in the art.

A readable mark in another embodiment is any mark that produces a change in absorption, reflectance, signal scattering, re-radiation, or polarization of a signal generated by a machine (e.g. a remote reader) or by ambient radiation.

The readable mark can optionally be distinguishable using visible light or non-visible electromagnetic radiation such as infrared, ultraviolet, X-ray, millimeter wave RF and others.

Optionally, the mark can be read and decoded visually by humans.

Optionally, the mark is machine-readable.

Optionally, the readable mark encodes error-correcting information.

Media Transfer Assembly

In one embodiment, the marking system described herein further comprises a pigment that forms the mark. In one embodiment, the pigment is provided in a media transfer assembly, where the marking device can make a mark by contacting the pigment and then contacting the substrate to be marked.

In one embodiment, the media transfer assembly is configured for placement on the substrate. In such an embodiment, the robotic assembly can be programmed to make a mark by inserting a marking member in a media transfer assembly (or otherwise contacting the media transfer assembly) and then transferring the pigment to the substrate (e.g. piercing the skin with the marking member) before retracting (or otherwise disengaging) the marking member from the media transfer assembly. Optionally the media transfer assembly comprises a transfer layer, transfer sheet, transfer membrane, or matrix comprising pigment. Optionally, the media transfer assembly comprises an adhesive on the side proximal to the substrate to be marked. Optionally, the marking member transfers pigment to the substrate from the media transfer assembly by forcibly biasing the pigment from the media transfer assembly. Optionally, the marking member comprises a needle, injector shaft, or tip there of (e.g. a solid needle).

In one embodiment, the media transfer assembly is configured for placement on a support other than the animal. Optionally, the media transfer assembly is configured for contact and disengagement by a marking device before a mark is made. In such an embodiment, the robotic assembly can be programmed to make a mark by contacting the marking device with the media transfer assembly for a period of time for the marking device to become loaded with pigment, (e.g. by inserting the tip of a needle of the marking device into the media transfer assembly) and then contacting the marking device with the substrate to make a mark. Optionally, contact between the marking device and the media transfer assembly discontinues (e.g. retracting a needle from the media transfer assembly) before contacting the marking device with the substrate. Optionally, the marking device transiently contacts the media transfer assembly for a period of time for the marking device to be loaded, is then removed from contact with the pigment transfer, and then contacted with the substrate to make a mark. Optionally the media transfer assembly comprises an ink or pigment pad, trough or container (e.g. pouch) filled with pigment, transfer layer, matrix comprising pigment, or the like. Optionally, loading the marking device comprises aspirating pigment from the media transfer assembly or allowing diffusion of the pigment into or onto a marking member.

In one embodiment, a media transfer assembly of the present invention is formed of one or more compartments, such as layers or "plies". Such an assembly, for example, can provide a convenient way of positioning the pigment next to (e.g. on) the body part to be marked. In one embodiment, an appropriate marking device, by moving through the media transfer assembly, can then pick up the pigment and deposit the pigment on or in the substrate to be marked.

In one embodiment, the media transfer assembly comprises a least three plies, wherein a first ply (or compartment) comprises a pigment and is layered between a second and a third "outer" plies. Optionally, the outer plies are formed as a laminate. Optionally, the second and/or third plies are plastic plies, for example, constructed of polyethylene or polynylon. Optionally, the pigment ply comprises a pigment carrier, for example a solid carrier or dispersants. Useful carriers include wicking carriers, absorbent carriers, tacky carriers, thickening carriers, matrix carriers, electrostatic carriers, pigment-philic carriers, and the like. By example, rice paper, foam, sponge, gels, and electrostatic or pigment-philic coatings provide useful carriers. In one embodiment, media transfer assemblies using such pigment carriers provide marks that are sharp and clear, have well defined perimeters, exhibit a high resolution, and/or are more efficiently made.

Useful media transfer assemblies include those which are constructed with outer plies that have one or more of the following properties: conformable to a non-planer substrate (e.g. tail), high tensile such that it does not break upon pulling taut or during handling, puncturable without causing excessive wear to a marking device (e.g. needle), allows ink to be transferred (e.g. pushed through) to a substrate, has low vapor loss (WVTR), has an elasticity such that it does not leak upon repeated puncture, and heat sealable. A media transfer assembly can provide a useful means of positioning the pigment around a cylindrical body part.

In one embodiment, outer plies are constructed of any material that provides such properties. For example, outer plies can be constructed from a plastic such as a polyester or a polyamide or any polymer known for its use in laminates or films. Optionally, outer plies comprise a polynylon, a polyalkylene (e.g. polyethylene, polypropylene, or copolymer thereof), or a derivative thereof (e.g. polyethylene terephthalate).

In one embodiment, a media transfer assembly is provided having pigment layered between outer plies, wherein the outer plies having any one, two, or three of the following structurally-dependent properties:

a WVTR from about 0.1 to about 3.5, gr./100 sq.in./24 hrs, for example, about 0.3 (as measured by the ASTM F-1249-90 method).

an elongation modulus of about 50% to about 90%, for example, about 70% (as measured by the ASTM D882-91; A method); and a puncture strength of about 10 to about 30 lbs, for example, about 15 lbs (as measured by the FTMS 101-C, 2065.1 method);

Such a media transfer assembly is not limited to plies constructed from any particular plastic (or other material). With the teachings provided herein, one skilled in the art can now select, without undue experimentation, outer plies which provide target properties taught herein. Such properties are dependent, for example, on the makeup or composition of a ply and the thickness of the ply. By example, outer plies having a thickness of about 0.003 in. and constructed from polyethylene or polyethylene terephthalate are useful to provide such a media transfer assembly. As another example, outer plies having a thickness of about 3 mm and constructed from polynylon are useful to provide such a media transfer assembly.

Useful outer plies (e.g. plastic plies such as polyethylene, or polynylon) include plies having a ply thickness that provides a water vapor transmission rate (WVTR) of about 0.45+/− about 5%, 10%, 15%, 20%, 25%, or 50%. Other useful plies include plies having a ply thickness that provides a water vapor transmission rate of about 0.3+/− about 5%, 10%, 15%, 20%, 25%, or 50%, for example, about 0.3+/− 10%.

Useful outer plies (e.g. plastic plies such as polyethylene or polynylon) include plies having a puncture strength of about 10 to 30 lbs. and an elongation modulus of about 50% to 90%.

In one embodiment, one or more of the outer plies has a thickness of about 0.003 in.+/−10%, 20%, or 30% and is constructed from a polyethylene or polyethylene terephthalate are useful to provide such a media transfer assembly.

In one embodiment, one or more of the outer plies has a thickness of about 3 mm+/−10%, 20%, or 30% and is constructed from a polynylon.

In one embodiment, compartments provide one or more of: a carrier or support for a pigment (e.g. a matrix, shell, or sandwich comprising pigment), an interface for supporting or otherwise coupling the media transfer assembly with the marking system (e.g. adhesive or locking member), or a barrier to seclude the pigment from the environment.

In one embodiment, the media transfer assembly comprises a frame (e.g. to support plies and/or position a media transfer assembly). Optionally, the frame is a rigid or semi-rigid frame. Optionally the frame comprises indexing components.

Figure 18:
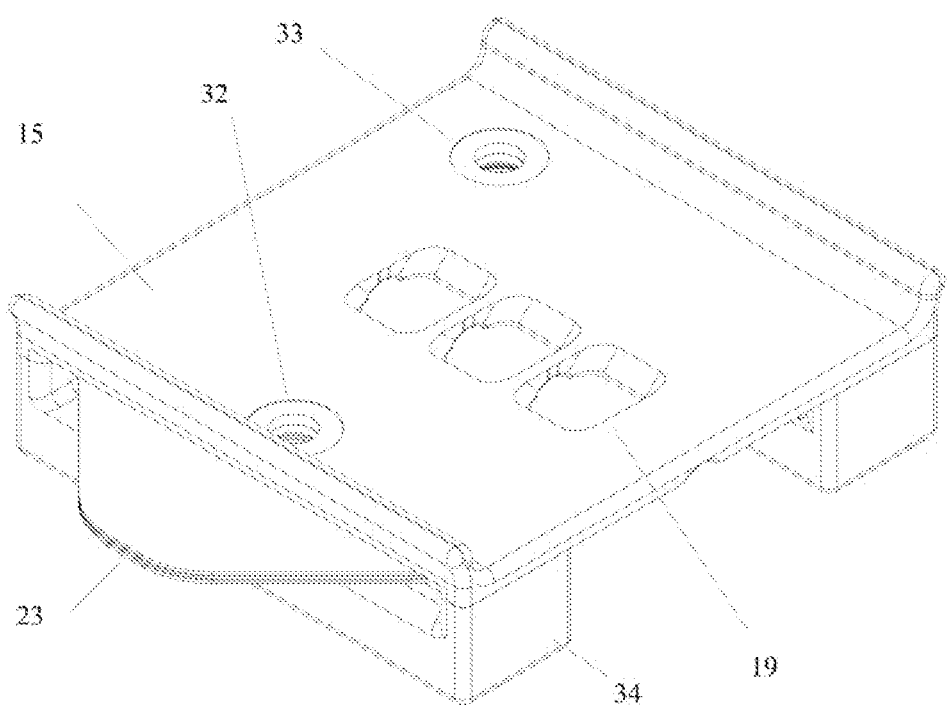
FIG. 18 depicts a media transfer assembly inserted into a body part restraint.
Figure 19:
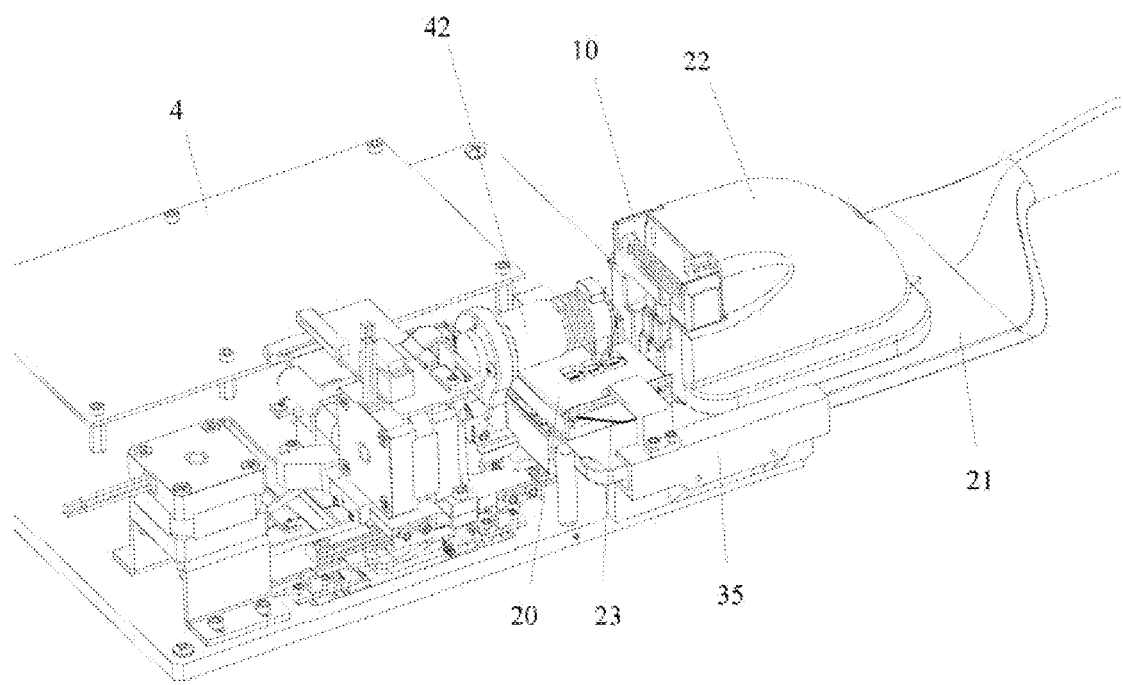
FIG. 19 depicts a marking system.

In one embodiment the media transfer assembly comprises indexing components (e.g. mechanical indexing components) such as indexing holes in order to position the media transfer assembly in a predetermined orientation with respect to a body part restraint, for example, as depicted in FIG. 18, and/or robot assembly, for example, as depicted in FIG. 19.

In one embodiment, a pack of media transfer assemblies is provided, wherein the media transfer assemblies are coupled to each other (e.g. in series or edge to edge). In such an embodiment, any given media transfer assembly can optionally be positioned by moving the pack as a whole. Optionally, the marking system is configured to remove a first media transfer assembly from a position for marking a substrate (e.g. removed from the substrate) while a second media transfer assembly (e.g. coupled adjacently to the first media transfer assembly) is placed into position for marking a substrate. For example, the pack of media transfer assemblies may be provided as a roll or reel of media transfer assemblies and the roll can optionally be placed on a rotating shaft (e.g. a shaft rotated by a motor) such that removal of the first media transfer assembly and simultaneous placement of the second media transfer assembly is accomplished by reeling or unreeling the pack. Optionally, the pack or the rotating shaft comprises indexing components for proper placement about a substrate.

Although the media transfer assembly is especially useful in the robotic marking systems of the present invention, the invention also contemplates an embodiment where the media transfer assembly is used outside a robotic system, for example, for marking a substrate (e.g. an animal or inanimate object) using a hand held marking device (e.g. a tattoo gun).

Pigments

In one embodiment, the pigment described herein is any pigment that can make a mark according to the disclosure described herein. Optionally, the pigment is bio-safe. Optionally, the pigment is bio-permanent.

Pigments described herein are any useful pigment, such as visible black ink, visible colored ink, infrared ink, fluorescent ink, electromagnetic ink, magnetic ink, fluorescent dye, ultraviolet dye, a pigment, or ink in the visible or non-visible spectrum. Optionally, a pigment comprises one or more drugs, particulates, powders, or liquids.

Assembly Compartments

In one embodiment, the media transfer assembly comprises one or more compartments (e.g. plies or layers) In one embodiment a first compartment (e.g. a matrix) provides a support for the pigment which can be affixed to or impregnated in a first compartment or between a first and second compartment.

The first compartment in one embodiment is a porous material and the porous material can optionally house the pigment. Optionally, the first compartment comprises a matrix such as a polymeric matrix.

The media transfer assembly can optionally comprise a second compartment (e.g. layer or ply). The second compartment can optionally be layered next to the first compartment. The second compartment can optionally be a non-porous material that can form a protective barrier.

The media transfer assembly optionally further comprises a second compartment wherein the second compartment is proximal to the first ply relative to the substrate to be marked and wherein the second compartment optionally contains (or is in the form of) an adhesive on the side proximal to the substrate to be marked.

The media transfer assembly optionally further comprises a second compartment wherein the second compartment is proximal to the first ply relative to the substrate to be marked and wherein the second compartment contains (or is in the form of) an a substrate softener or lubricant (e.g. oil or gauze soaked in oil). For example, one embodiment provides a disposable media transfer assembly comprising a softener or lubricant on the side proximal to the substrate, wherein the softener or lubricant is covered by a layer that can be removed (e.g. peeled away) to expose the softener or lubricant before the media transfer assembly is placed on the animal. In one embodiment, the oil makes tattooing easier by conditioning the skin and lubricating the process as the marking members puncture.

Adhesives

In one embodiment the adhesives used herein are any adhesives. In one embodiment, the adhesive is a bio-safe adhesive (e.g. for adhering a media transfer assembly on or near an animal substrate).

Animals

In one embodiment, an animal is marked by the present marking system. For example, the animal can be an animal with a cylindrical or conical body part such as a tail, leg, arm, antler or horn, etc.

In any embodiment, the animal can be any mammal, bird, or other vertebrate. It can be any rodent (e.g. mouse, rat, hamster, gerbil, etc.), a rabbit, primate, or human.

In one embodiment, is an animal marked using the marking system described herein. In another embodiment is a marked mouse or a marked rat.

Substrates

Any body part can be marked as the substrate (the 'substrate portion of the body part'). For example, the body part can be any part covered by skin.

In another embodiment, the body part has some cylindrical character such as such as a tail, an ear, a leg, an arm, an antler or horn, a finger, toe, neck, or snout.

Tail

In one embodiment, the use of a tail (e.g. mouse tail) as a substrate provides one or more of the following advantages. An advantage of marking the tail is that the tail often has less hair than other parts of the animal making it easier to apply. Another advantage of marking the tail is that a mark encircling the tail is visible from all sides, making it easier to distinguish markings in a way that doesn't require precise alignment between the animal and the scanner. Another advantage of marking the tail is that image-processing software can more easily distinguish the tail shape and location, thus allowing a lower-cost image processor, faster image processing and a lower-cost mark reading system. Another advantage of marking the tail is that animals are frequently handled by the tail so it is easier to present the tail to a reading system. Another advantage is that the tail is more easily manipulated than the entire animal, so it is easier to present the tail to the reading system. Another advantage of the tail is that it provides a long, relatively uniform, uninterrupted surface for marking and in some cases more data can be stored in tail markings than other animal body structures. Another advantage of tail marking is that it is less invasive than other commonly used techniques such as surgical removal of fingers and toes. Another advantage is that it is easier to account for animal growth than areas such as the ear where ear notches can become partially healed or deteriorate into less-distinguishable markings. Another advantage over finger/toe removal and ear notching is that the identifying mark can be applied automatically, speeding up the application process, reducing errors, reducing the need for costly trained labor. Another advantage over finger/toe removal and ear notching is that the identifying mark can be read automatically, speeding up the reading process, reducing errors, reducing the need for costly trained labor.

One key step is making a distinguishable mark on, in or optionally around (encircling) the tail. Optionally, a marking can be composed of optically-visible material. Optionally a marking can be composed of material that is distinguishable using electromagnetic radiation that is not normally visible such as infrared, ultraviolet or microwave radiation. The distinguishable mark can optionally be made by heat branding, freeze branding, bleaching, chemical staining, fluorescent dyes, implanted pigments or implanted marking mediums. The distinguishable mark could be constructed to increase or decrease absorption, reflectance, scattering, polarization or other distinguishable characteristics. Optionally, the mark can be applied using a tattoo process, an injection process, an insertion process, a diffusion process, a surface-staining process, and/or a scarring process. This mark can optionally be applied by hand, or optionally by hand using a template, or optionally automatically using pre-determined computer-controlled or mechanically-controlled patterns.

One observation is that mice unexpectedly maintain a relatively straight tail. If mice tails frequently curled up such that markings applied to the tail are partially obscured, a readable mark would need to include more error correcting information. Because overlapping tails are less common than expected, more information can be stored and less information-storing space needs to be devoted to error correction.

Remote Reader

In one embodiment, the present systems can further include a remote reader that can read a machine readable mark. The remote reader can be any reader that can read a mark that produces a change in absorption, reflectance, signal scattering, re-radiation, or polarization of a signal generated by a first remote reader or ambient radiation.

In one embodiment, the remote reader generates an interrogating signal and the signal is read on the side of the animal opposite of the signal generator.

In another embodiment, the remote reader generates an interrogating signal and the signal is read on the same side of the animal as the signal generator.

Examples of useful remote readers according to the present invention are wand Reader, Pen bar code Reader, Microwave Reader, Capacitance Reader, Camera, Omni-Directional Barcode Reader, CCD Imager, CMOS Imager, Fixed Position. The reader in a further embodiment is hand-held or battery operated.

The remote reader in one embodiment comprises a single sensor or an array of sensors.

The remote reader in another embodiment is a 2-dimensional image sensor such as a CMOS image sensor, a CCD image sensor, a raster-scanned sensor, a microwave reflectometer, or an X-Ray image sensor.

In one embodiment, the remote reader is a 1-dimensional image sensor such as a photo-detector, photo-diode or other signal transducer where the sensor is moved across the distinguishable mark and a 2-dimensional profile of the marked area is reconstructed from the 1-dimensional data taken over a period of time.

The remote reader in another embodiment is built into tweezers, forceps, pliers or other pinching or grabbing devices so that animals are read when contacted by the reader or during transfer when held by the tail.

The operator in another embodiment is to present the tail or entire animal including the tail to a fixed reader located near the animal handling area. The reader in another embodiment is fixed into a position within view of the animals in a cage or other habitat such that the reader can continually or periodically read all animals in view. The reader in a further embodiment is fixed in proximity to an area of utility such as to provide additional behavioral information such as watering and feeding habits or intra-habitat movement. A standard barcode reader is not likely to work well for this application because of the curvature of the tail. Custom software that identifies the tail is helpful to decoding because the tail feature can be extracted by custom image-processing software.

In yet a further embodiment, is a machine readable mark and the machine reading of the mark is coupled to other automated events such as allowing or preventing the marked animal access to food, treatment, environmental conditions, experimental conditions, or physical locations.

The citations provided herein are hereby incorporated by reference to the extent relevant for the cited subject matter.

EXAMPLES

Example 1

Marking System

A mouse tail is marked as illustrated in FIG. 1. The marking system is comprised of a needle assembly [1], an R axis needle actuator [2], a Y-Axis actuator [3], a θ-Axis actuator [4], and a restraining device [5]. A disposable media transfer assembly [6] covers the surface of the tail of the mouse. To apply a mark, the machine is actuated along its various axes to position the marking device about the skin substrate (and media transfer assembly). Actuation of needle actuator [2] causes the marking device needle tip to puncture the media transfer assembly, and transfers the pigment to the skin substrate as it continues down through the media transfer assembly and into the skin of the animal, depositing the pigment beneath the surface of the skin. The process is repeated to produce a readable mark.

Example 2

Marking System

Figure 3:
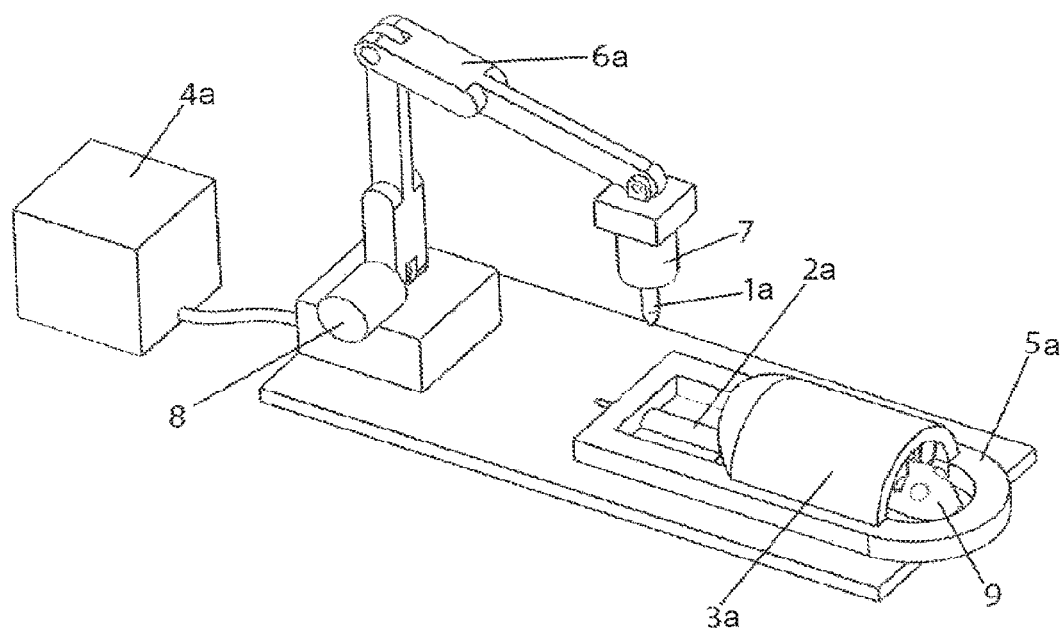
FIG. 3 depicts model 3.
Figure 4:
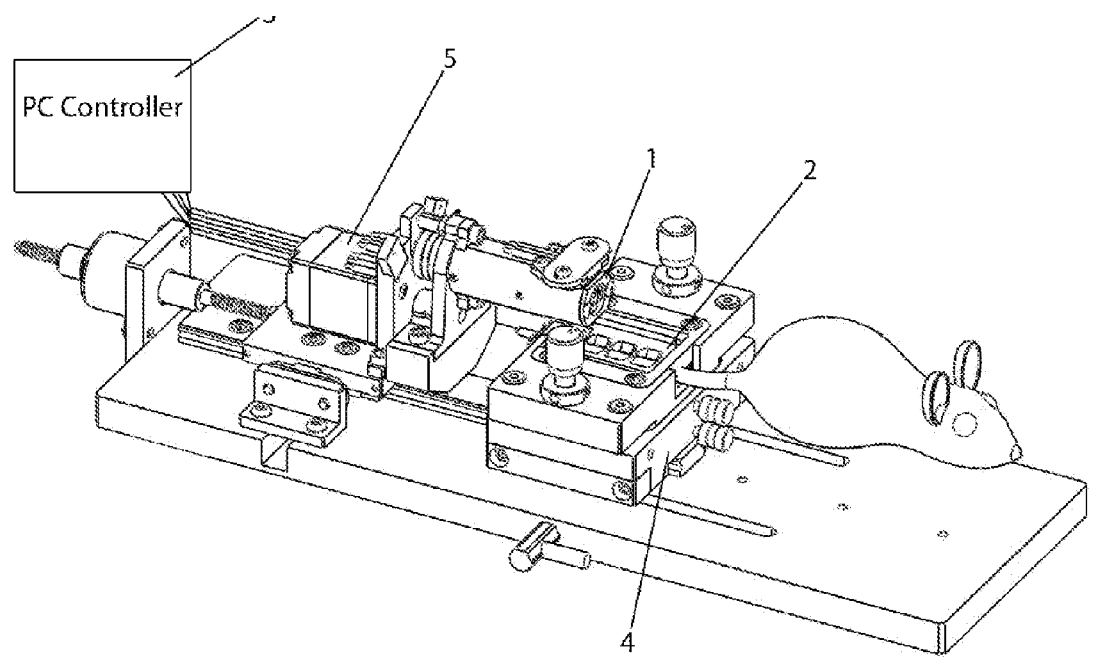
FIG. 4 depicts model 4.
Figure 5:
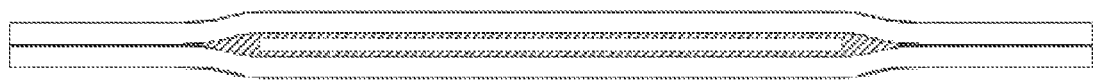
FIG. 5 depicts a media transfer assembly.

A readable mark is made by the marking system of FIG. 3. The robot comprises an actuator (8) which positions the robotic arm (6a), an actuator (7) which is attached to the robotic arm and the marking device (1a) and actuates the marking device (1a). The animal (9) is restrained in restraining device (3a). A mark is made on the tail when the marking device (1a) moves through the media transfer assembly (2a) to pierce the skin of the tail. The process is repeated as controlled by the controller (4a) to produce a readable mark. An indexing device (5a) of the restraining device (3a) which positions the restraining device (3a) relative to the robotic arm provides the controller positional information relative to the robotic assembly to the controller such that the marking device can be contacted with the substrate in a precise manner, regardless of the animal's position.

Example 3

Restraining Device

Figure 10:
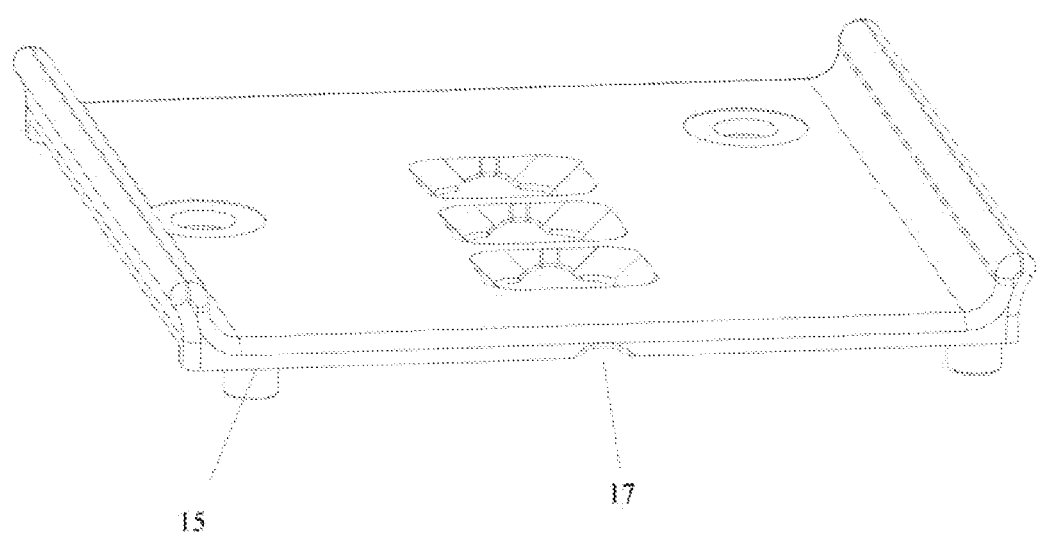
FIG. 10 depicts a body part plate.
Figure 11:
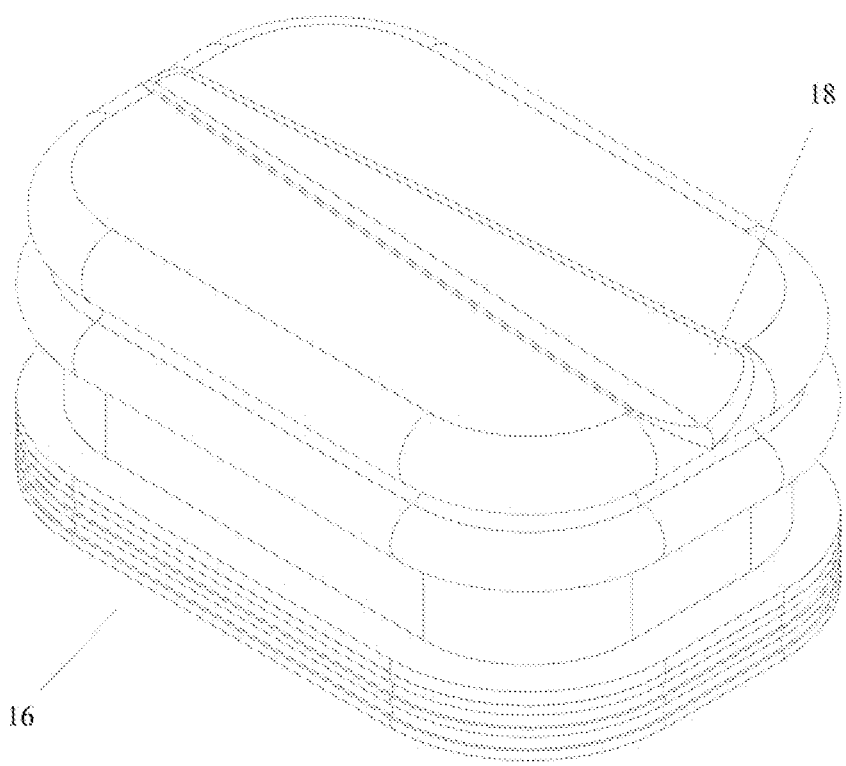
FIG. 11 depicts a body part plate.

A restraining device is used as shown in FIG. 7. The body restraint (2b) contains the body of the animal. In one embodiment, the restraint (2b) is clear or keeps the body of the mouse visible to the operator at all times. The restraint (2b) attaches to a baseplate (1a) via clips, gravity, magnets, or other means. A tail plate assembly comprising a spring-loaded tail plate (3a) and fixed tail plate (5b) work together to make the top of the tail surface perfectly horizontal or at a predetermined desired angle or other orientation relative to the baseplate. Adjusting the angle of the top plate (5c) adjusts the final angle of the top of the tail. The spring loaded tail plate (3a) has springs sitting under it (springs not shown) causing it to push the tail up against the fixed tail plate (5b). The spring loaded tail plate (3a) complies with the angle of the bottom of the tail surface since it has four independent springs pushing up at all four corners (springs not shown). The operation windows (6a) are in the fixed tail plate (5b) and allow the operator to access the tail or restrained body part while holding its position. In the case of a conical body part, the spring loaded plate has a v-groove (e.g. at an angle of 90 degrees or greater) to Center various cone diameters, for example, as depicted in FIG. 10. The top plate (5c) in some embodiments has a radius groove cut into it large enough to accommodate the largest conical body part that will be restrained, for example, as depicted in FIG. 11. These opposing features (v-groove of spring-loaded tail plate (3a) and radius groove of top plate (5c)) keep the body part centered along the longitudinal axis while pressing it securely and evenly against the top plate (5c). The illustrated tail cleats (8a) in one embodiment are either cam cleats or could be as simple as spring-loaded pinchers. The purpose is to minimize or eliminate longitudinal movement of the restrained body part. In the case of a tail and tail cleats (8a), the tail is inserted into the cam cleats. Once inserted, the tail cleats (8a) keep the tail from moving forward. When cam cleats are used as tail cleats (8a), if the tail does try to move forward, the cam cleats squeeze harder and harder as the tail is pulled forward (sailboats use this method to keep ropes tight). When the tail cleats (8a) are pinched at the thumb tabs sticking out, the tail cleats open and release the tail. The disposable pigment container (7a) is inserted into the top tail plate (5c) and stretches down over the tail when the top plate (5c) is lowered onto the tail. The kickplate (4b) is held to the baseplate via magnets or clips. The magnets or Clips are such that if an operator pulls the animal into the kickplate with too much force, which would otherwise endanger the tail-body connection, the kickplate breaks away instead of the tail breaking off of the body. The body restraint (2b) in some embodiments has holes in the front for breathing and holes in other positions for access to the animal or to pull body parts (legs, feet) out of the restraint for operations while keeping the rest of the animal confined.

Example 4

Marking a Mouse with a Present Marking System

A readable mark was made on a mouse body part (the substrate). A mouse was restrained in a restraining device wherein the devise was a stand-alone restraint cartridge comprised of a tube as a body restraint, cam cleat as a body part cleat, and spring loaded squeeze plates made of acrylic as a body part restraint. At the distal end of the tube there was a large taper enabling rapid insertion of a mouse by pulling the animal backwards into the tube by the tail. A slot cut through the top of the tube from the distal to proximal end allowed the tail to be pulled all the way through the tube to the proximal end. At the proximal end of the restraining device, directly behind the proximal end of the tube, was a cam cleat in which the tail of the mouse was inserted, allowing the tail to be pulled back into the cam cleat, then locking, keeping the mouse from pulling the tail forward.

The pigment, a first ply, a second ply and a third ply were assembled into a media transfer assembly. The second ply was a layer of 0.005" urethane and an acrylic-based adhesive was affixed to the side proximal to the tail (i.e. the substrate to be marked). A first ply comprised a layer of 0.001" rice paper was placed on the side of the second ply distal to the substrate to be marked. The biosafe and permanent pigment was standard black tattoo ink which was dispensed onto the rice paper. The third ply was a 0.001" urethane layer, completing the 3-ply media transfer assembly.

The media transfer assembly was wrapped around tail.

The tail restraining portion of the restraining device further comprised spring-loaded plates used to restrain down the length of the tail. A lower, spring-loaded bottom plate pushed the disposable strip-covered tail up against a solid, rigid, flat top plate affixed parallel to the base of the restraint, causing the top of the tail to be perfectly parallel with the base plate of the restraint. The tapered tube was held in place on a base with magnets and restrained the body of the animal.

The marking device consisted of a three-tipped needle cartridge attached to the robotic arm with a scotch yoke cam device. The robotic arm was driven by a brushless DC motor running at 200 Hz. The robotic arm further comprised a rotary actuator that moved the marking head around the curved surface of the tail to create horizontal markings across the surface of the tail. The rotary actuator was attached to a linear actuator which moved the robotic arm up and down the length of the tail, creating vertical markings on the surface of the tail running from the proximal end to the distal end of the tail.

The controller further comprised an embedded motion control system and actuated all three actuators in unison, following bitmap font patterns to create or 'draw' the three characters that were entered by the user at the beginning of the procedure.

A three character alphanumeric code was programmed into the controller via a keypad and the 'Start' button was pushed. The device then placed a readable mark in the substrate (i.e. the dermis of the tail of the animal) via a three-tipped needle cartridge being actuated down through holes in the top of the tail plate, through the media transfer assembly then into the dermis of the tail of the animal.

After the marking system was finished creating the mark, the user removed the restraining device such that it was no longer positioned in a fixed manner from the robotic arm, released the tail from the spring-loaded plates then removed the disposable media transfer assembly from the tail and discarded it. The user then released the base of the tail from the cam cleats by squeezing wings on the cams towards each other, thereby opening the cleat and releasing the holding force on the tail. The user then pulled the magnetically held body restraint tube from the base plate, releasing the animal completely from restraint.

Example 5

Media Transfer Assembly

Figure 16:
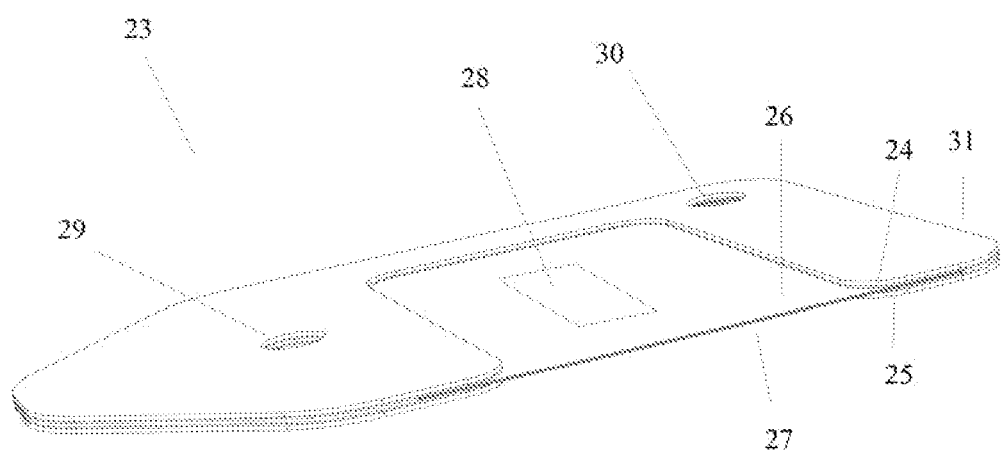
FIG. 16 depicts a media transfer assembly.

FIG. 16 depicts a useful media transfer assembly of the present invention. The media transfer assembly 23 comprises a pigment compartment 28 between a first ply 26 and a second ply 27. The pigment compartment 28 is a formed as a carrier ply (e.g. rice paper or other carrier ply taught herein) sandwiched between plies 26 and 27. Plies 26 and 27 can be constructed out of any suitable material that provides a barrier to the pigment compartment 28. For example, plies 26 and 27 can be constructed as a laminated polyethylene film having a ply thickness that provides a water vapor transmission rate (WVTR) of about 0.3+/- about 10%, 20%, or 50%. The pigment compartment 28 can be formed, for example, by heat pressing plies 26 and 27 around the perimeter to seal pigment compartment 28.

The media transfer assembly 23 in some embodiments further comprises a frame 31 to support plies 26 and 27 (e.g. such that the plies are taut). For example, frame 31 can comprise frame halves 24 and 25 which come together to sandwich plies 26 and 27. Media transfer assembly 23 in yet a further embodiment comprises indexing components (e.g. mechanical indexing components) such as indexing holes 29 and 30 in order to position the media transfer assembly 23 in a predetermined orientation with respect to a body part restraint, for example, as depicted in FIG. 18, and/or robot assembly, for example, as depicted in FIG. 19. The indexing components 29, 30 can be aligned, for example, by an indexing member (e.g. indexing peg) extending from a baseplate (not shown).

Example 6

Loading a Media Transfer Assembly with Pigment

Figure 17:
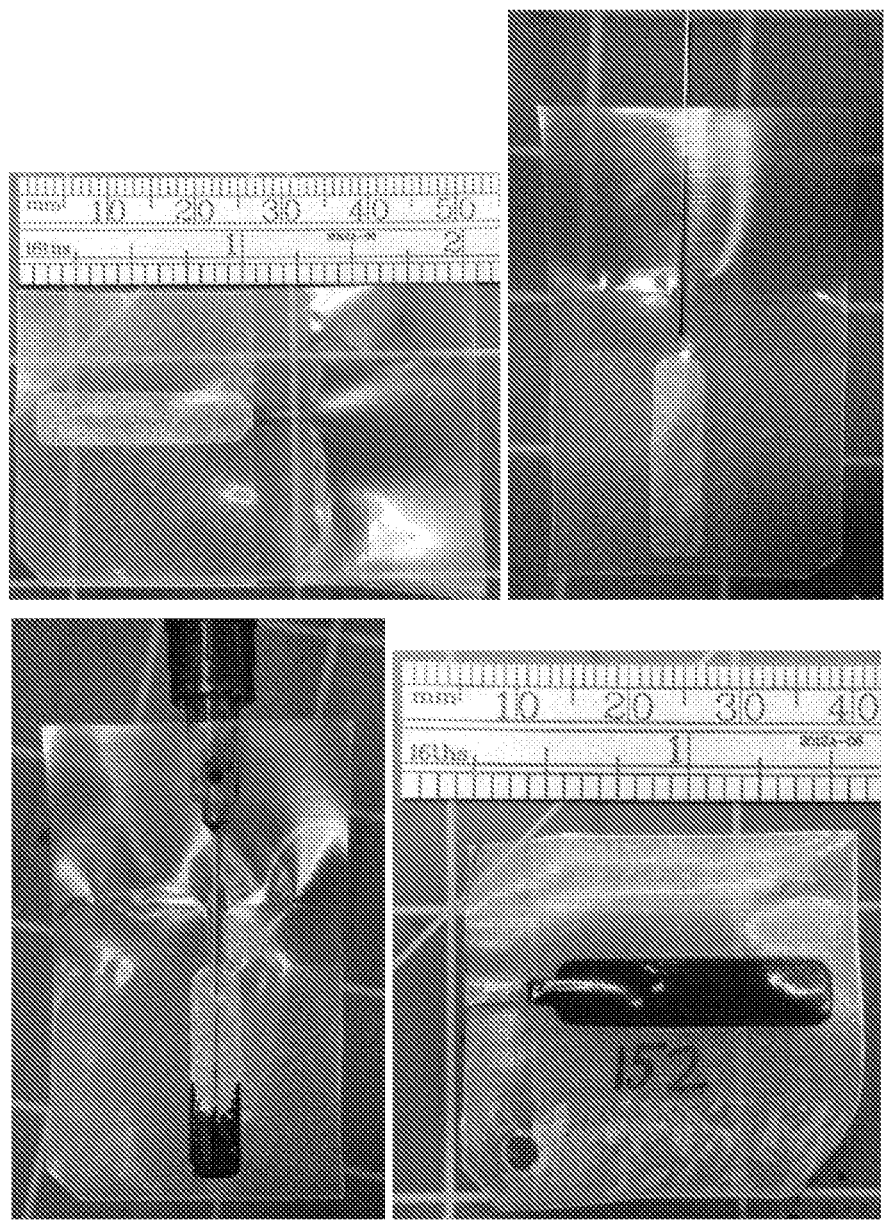
FIG. 17 depicts filling of a pigment compartment in a media transfer assembly.

A media transfer assembly, such as that described in Example 5, is in some embodiments impregnated with pigment (e.g. ink) as follows. The pigment compartment 28 can optionally be filled with pigment by injection, for example, by inserting the needle of a syringe (or other device) between the junction of plies 26 and 27 to access the pigment compartment 28. In such an embodiment, a small canal is optionally pre-formed between plies 26 and 27 to allow insertion of the syringe needle, as depicted in FIG. 17.

The media transfer assembly 23 can optionally be placed on the substrate, and a mark made by inserting one or more marking members (e.g. needles) through ply 26 and into the pigment compartment 28 where the marking member(s) picks up pigment. The marking member(s) continues through ply 27 and deliver the pigment into the substrate.

Example 7

Development of a Media Transfer Assembly

To provide effective and accurate marking using a media transfer assembly, a marking device (e.g. needle) must transmit pigment from the media transfer assembly to the substrate to be marked. Marks are in some embodiments made, for example, by a process called "stippling" i.e. the making of a mark by repeatedly contacting a substrate with the marking device, for example, where each instance of contact with the substrate by the marking device creates a single pixel. Effective carriers that overcome any voids caused by surface tension of a liquid pigment and/or the creation of transient microvoids in the pigment compartment during stippling, is in one embodiment the use of solid plies or dispersants, and include that are of one or more of the following types: wicking, absorbent, tacky, thickening, matrices, electrostatic, pigment-philic, and the like. By example, rice paper, foam, sponge, gels, and electrostatic or pigment-philic coatings provide useful carriers. In one embodiment, media transfer assemblies using such pigment carriers optionally provide marks that are sharp and clear, have well defined perimeters, exhibit a high resolution, and/or are more efficiently made.

Also described herein are media transfer assemblies having one or more of the following properties: conformable to a non-planer substrate (e.g. tail), high tensile such that it does not break upon pulling taut or during handling, puncturable without causing excessive wear to a marking device (e.g. needle), allows ink to be transferred (e.g. pushed through) to a substrate, has low vapor loss (WVTR), has an elasticity such that it does not leak upon repeated puncture, and heat sealable. Several of these properties have inversely or negatively correlated with each other (e.g. vapor loss, and are generally dependent on the thickness of a given material. In one embodiment, poly-nylon with a thickness of about 3 mm (e.g. Calvac6X) provides material for outer plies of a media transfer assembly. A poly-nylon ply with a thickness of 3.0 mm provides the following physical properties:

TABLE 5

Properties of 3 mm Poly-Nylon Plies

| Physical Property | Method of Measure | Typical Properties |
|---|---|---|
| Total Thickness | | 3.0 mil |
| Watervapor Transmission Rate (WVTR) | ASTM F-1249-90 | 0.4560 gr./100 sq.in./24 hrs |
| Oxygen Transmission Rate | | 3.5-4.5/cc/100 sq.in./24 hrs |
| Tensile Strength | ASTM D882-91; A | MD 4800 psi TD 3800 psi |
| Elongation | ASTM D882-91; A | MD 45% TD 55% |
| Tear Strength | ASTM D1004-94 NOTCHED | MD 2.1 lb. TD 2.8 lb. |
| Puncture Strength | FTMS 101-C; 2065.1 | 20.5 lb. |
| Light Transmission | ASTM D1003-92 | >90% |
| Heat Seal Strength | ASTM D-1876-93 VERTROD | 22 lb./in. width |

Such a poly-nylon ply provided desired WVTR. Accordingly, one embodiment of the present invention provides a media transfer assembly comprising outer plies with a WVTR of about **0.456, +/- about 10%, or about 20%.

Although such a poly-nylon provides a media transfer assembly, further development of a media transfer assembly with greater pigment-transfer capability was desired for certain applications. Accordingly, the present invention provides a media transfer assembly comprising outer plies having a puncture strength of about 10 to 30 lbs. and an elongation modulus of about 50% to 90% (as measured by the ASTM D882-91; A method).

In one embodiment, a media transfer assembly can be provided with plies of the polyethylene type (e.g. polyethylene, polyethylene terephthalate, etc) can be constructed with desired WVTR while additionally providing pigment transfer capabilities. Accordingly, the present disclosure provides a media transfer assembly comprising plies of the polyethylene type. Optionally, the plies have a thickness in the range of about 0.002 to 0.010 inches.

Example 8

Body Part Plate with Inserted Media Transfer Assembly

FIG. 18 depicts a media transfer assembly 23, as detailed in Example 5, inserted into a body part plate assembly 20, as detailed in Example 11 (spring loaded plate 16 not shown). Plate 15 comprises an indexing component(s) such as indexing holes 32, 33 in order to secure media transfer assembly 23 and/or properly align the pigment compartment 28 of the media transfer assembly 23 with the operation window 19 of the plate 15. As depicted in FIG. 18, the media transfer assembly 23 is in the proper position when the indexing components 29, 30 of the media transfer assembly 23 are aligned with the indexing holes 32, 33 of plate 15. The media transfer assembly 23 in some embodiments are secured by inserting a first peg through indexing hole 32 and indexing hole 29 and a second peg through indexing hole 30 and indexing hole 33 (pegs not shown).

Example 9

Restraint Baseplate

Restraining devices described herein in some embodiments are supported and/or fixed to (e.g. reversibly fixed to) a baseplate. The baseplate itself can be reversibly fixed in position with respect the robot assembly.

Figure 31:
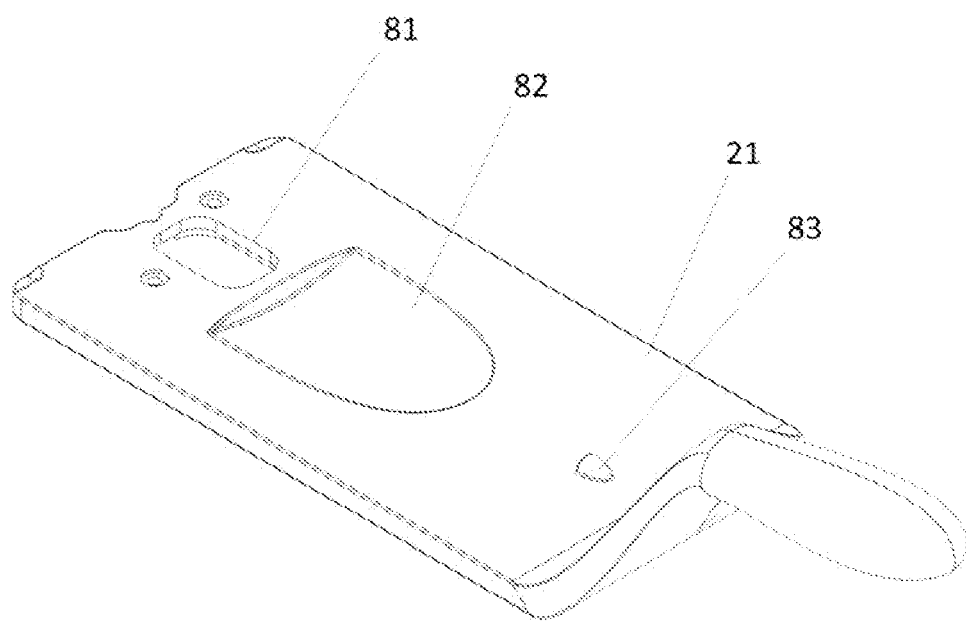
FIG. 31 depicts a baseplate.
Figure 32:
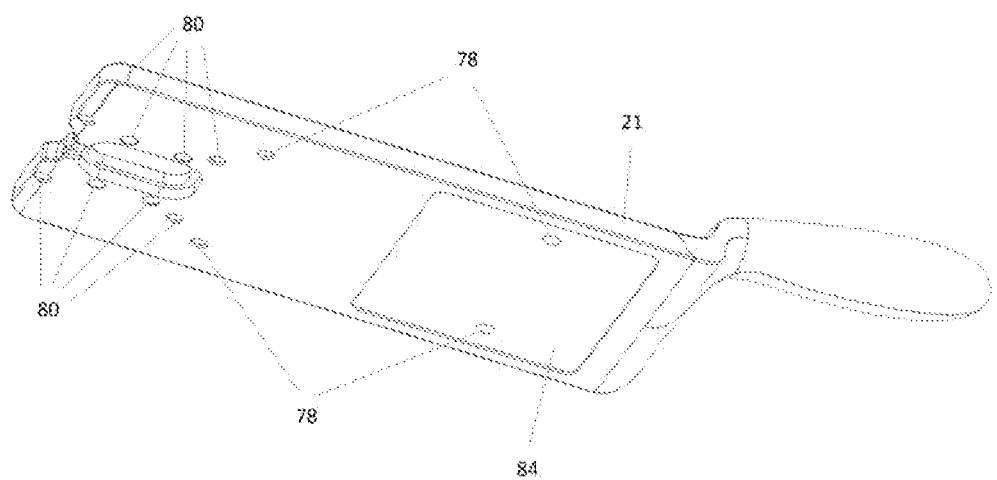
FIG. 32 depicts a baseplate.

For example, the restraint baseplate in some embodiments has one or more components of a baseplate 21, as depicted in FIG. 31 and FIG. 32.

Figure 29:
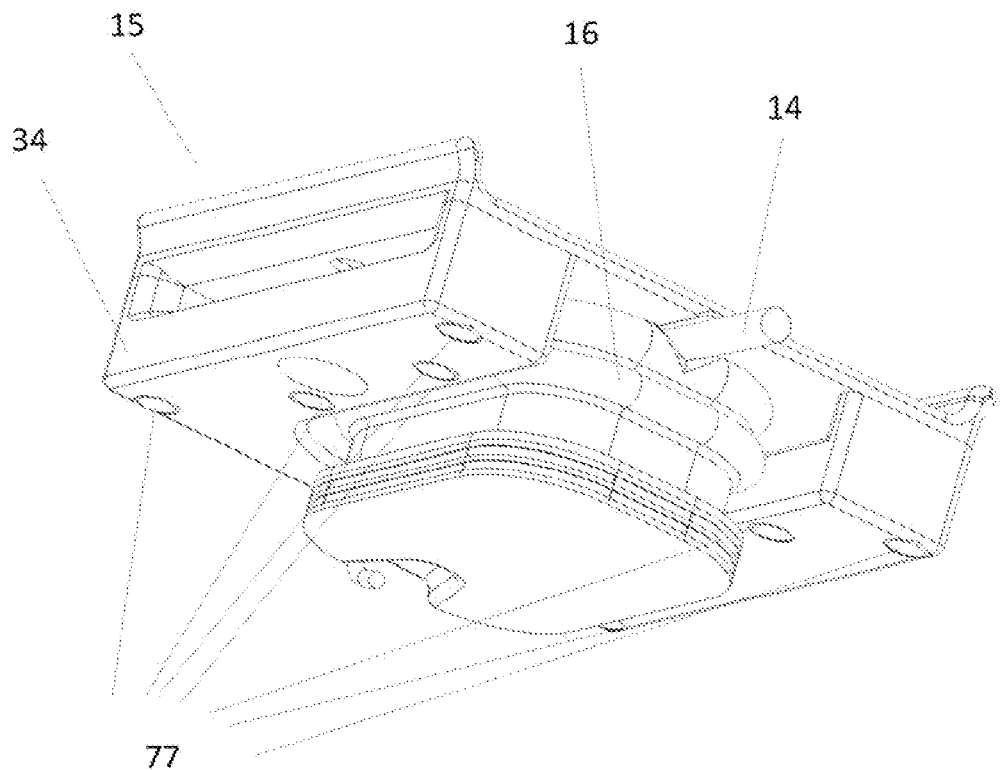
FIG. 29 depicts a body part plate assembly.
Figure 30:
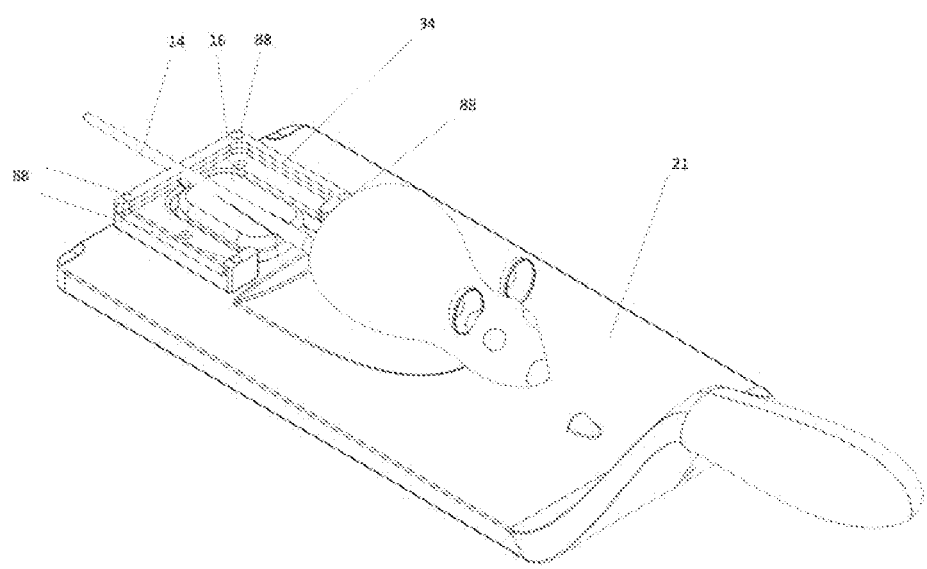
FIG. 30 depicts a restraining device.

The baseplate 21 in one embodiment comprises means to reversibly secure a restraining device, for example, magnets 80 to secure a fixed body part plate in the proper orientation and/or magnets 78 to secure a body restraint. For example, the magnets 80 in some embodiments are provided in a patter which corresponds to a pattern of magnets 77 on the support 34 of a fixed body part plate 15, as depicted in FIG. 29. Likewise, the magnets 78 in further embodiments are provided in a patter which corresponds to a pattern of magnets of a body restraint.

The baseplate 21 in yet other embodiments comprise a restraint indexing members such as body restraint indexing member 83 and/or a body part plate indexing member such as an indexing member 81 for acceptance of a biased body part plate.

The baseplate 21 in another embodiment comprises a debris collection area 82, for example, a trough to concentrate urine and/or feces.

The baseplate 21 in one embodiment comprises an anti-slip member 84 (e.g. pad), for example, to prevent slippage of the baseplate 21 while on a lab bench.

As depicted, the baseplate 21 in another embodiment further comprises a handle, for example, for use when the baseplate is reversibly fixable with respect to a robot assembly or for use outside of a marking system.

Example 10

Restraining Device Comprising a Body Part Cleat

FIG. 8 depicts a useful body part cleat of the present invention. The restraining device comprises a body part (e.g. tail) cleat 10 comprising opposing members 11 and 12. A biasing member 13 such as a spring biases the opposing members 11,12 against each other, thereby restraining the body part of the mouse 9 from longitudinal or Y axis movement, which is inserted between the opposing members 11,12. As illustrated, the body part cleat 10 in one embodiment is positioned proximal to the trunk of the mouse 9.

In another embodiment, the body part cleat assembly 10 has tabs such as finger tabs 74 such that the user loads and releases the body part with a single hand and in a single motion. Although the body part cleat is depicted has having opposing members 11, 12 which slide about each other (a sliding cleat), the body part cleat can alternatively be provided in other configurations (e.g. as described herein).

Such a body part cleat in some embodiments provides rapid but secure immobilization of an animal or body part thereof.

Example 11

Restraining Device Comprising a Body Part Plate Assembly

Figure 9:
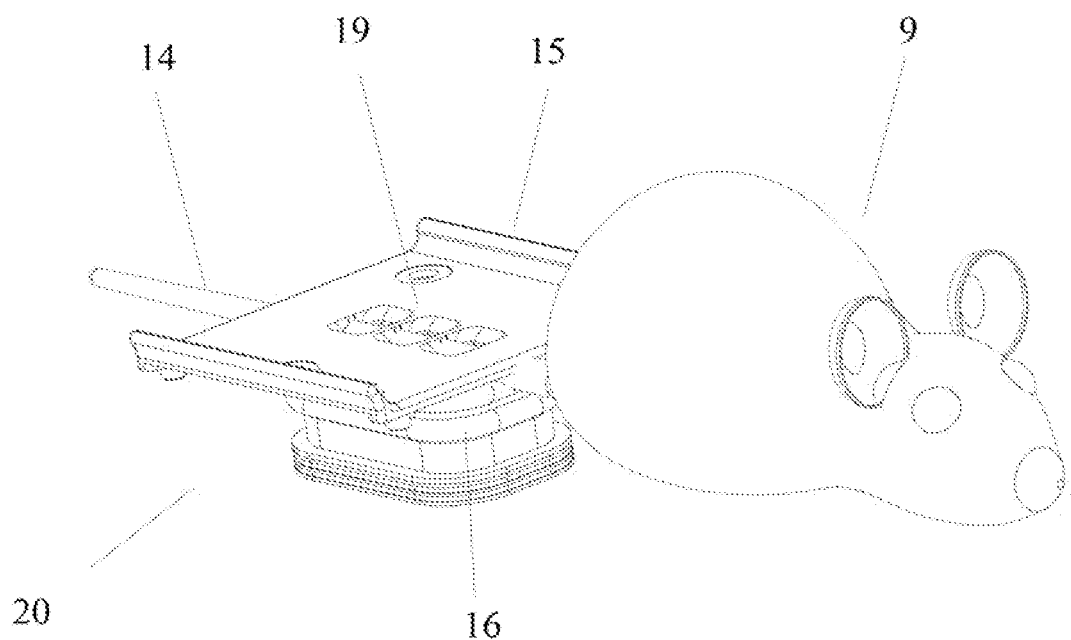
FIG. 9 depicts a body part plate assembly.

FIG. 9 depicts a useful body part plate assembly of the present invention. The restraining devices comprises a tail (or other body part) plate assembly 20 comprising a fixed plate 15 and a biased (e.g. spring-loaded) tail plate such as a biased tail plate assembly 16, which work together to orient the top of the tail (or other body part) surface perfectly horizontal (or at a desired angle or along a desired axis or other orientation) relative to the baseplate (baseplate not shown) or other reference. Optionally, adjusting the angle of fixed plate 15 adjusts the final angle or orientation of the top of the tail.

Figure 24:
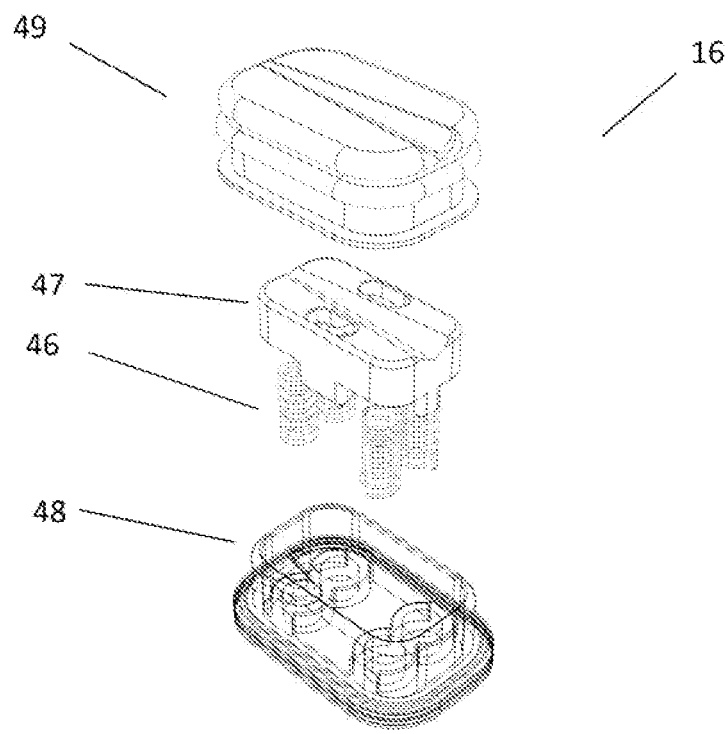
FIG. 24 depicts an exploded view of a spring loaded tail plate.
Figure 33:
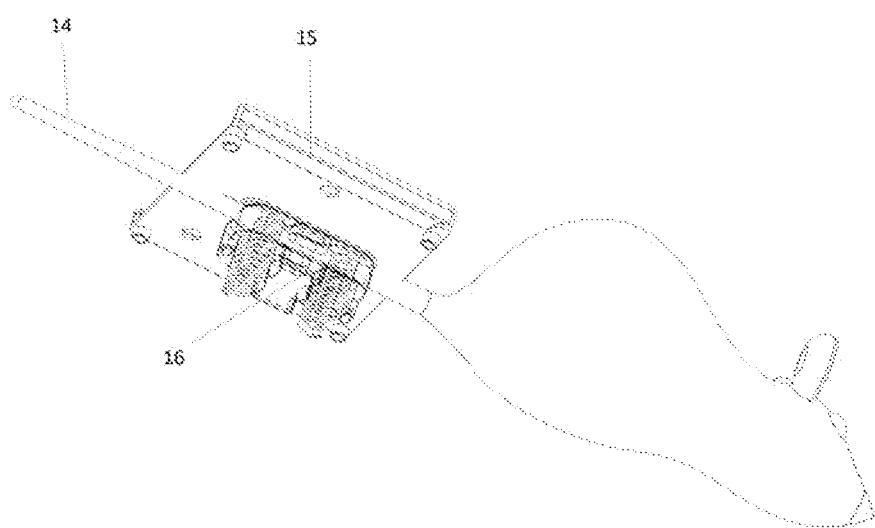
FIG. 33 depicts a body part plate assembly.

As depicted in the exploded view of FIG. 24, the biased plate assembly 16 has biasing means such as springs 46 or other conformative-biasing means or other elastic-biasing means, for example, causing the plate 16 to push the tail against the fixed, tail plate 15, as depicted in FIG. 9 and FIG. 33. When using conformative-biasing means such as springs 46 (e.g. under all four corners of plate 47), the spring loaded tail plate 47 will conform to the angle of the bottom of the tail surface as it opposes plate 15, as depicted in FIG. 33. As depicted in FIG. 24, the tail plate assembly 16 in some embodiments comprise a mount 48 for support and/or comprise a boot 49 (e.g. made of rubber or other non-rigid material) to allow motion of the plate 47 without exposing the underlying mechanism to debris, allowing easier cleaning and reducing contamination.

The operation window(s) 19 is in the fixed tail plate 15 and allows the operator or marking members to access the substrate portion of tail 14 or other restrained body part while holding its position. As depicted in FIG. 11, in the case of a conical (or other tapered) body part such as a tail 14, the spring loaded plate 15 can be provided with a v-groove 18, e.g., at an angle of 90 degrees or greater, to center various cone diameters. As depicted in FIG. 10, the top plate 15 can have a radial groove 17 large enough to accommodate the largest conical body part that will be restrained. These opposing features (v-groove 18 of spring-loaded tail plate 16 and radial groove 17 of top plate 15 keep the substrate portion of body part 14 centered along the longitudinal axis while pressing it securely and evenly against the top plate 15. In one embodiment, marks made on a substrate restrained by such a body part plate assembly are extremely precise, for example, because the plate assembly restrains the substrate portion of the body part such as tail 14 from movement along the X, Z, and/or R axes.

Example 12

Restraining Device Comprising a Body Restraint

Figure 21:
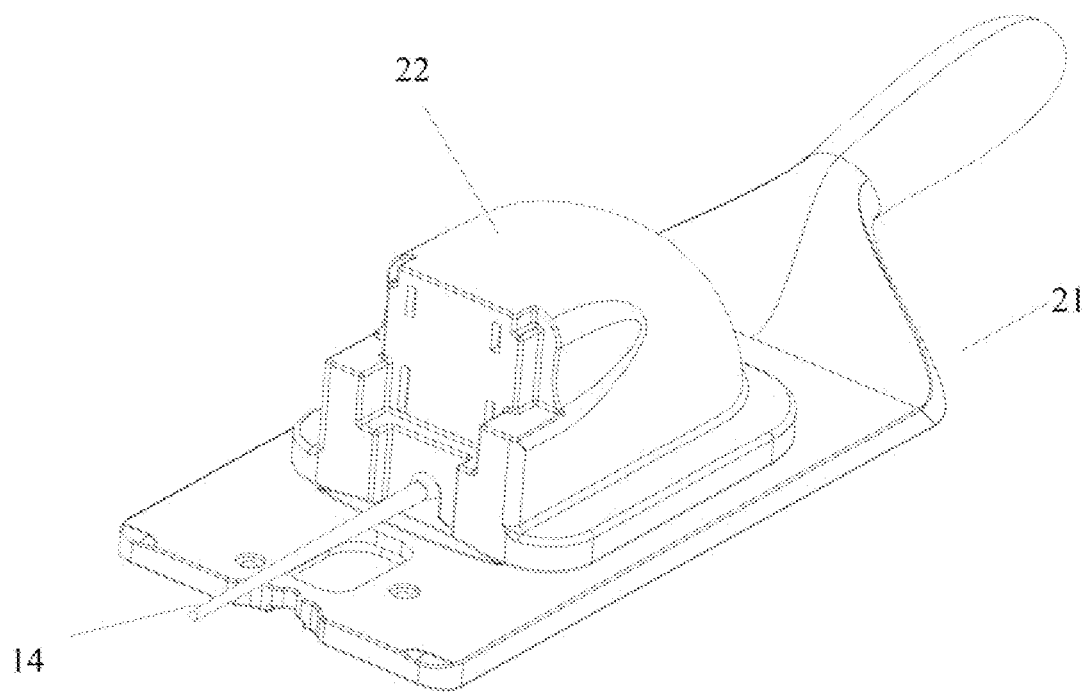
FIG. 21 depicts a restraining device.

FIG. 21 depicts a useful restraining device of the present invention. The restraining device comprises a body restraint 22 and is depicted on a support, for example, baseplate 21. The body restraint 22 is sized to house an animal (or abdominal portion thereof) and comprises a body part port 43 sized to allow a body part comprising the substrate (e.g. tail) to be withdrawn from the body restraint 22 while the trunk of the animal remains in the body restraint 22.

The body restraint 22 in some embodiments is configured in any shape or size that restrains the trunk of the animal, prevents the animal from swiveling its head to harm (e.g. bite) itself, and/or prevents the animal from contorting or pivoting about its body part (e.g. tail).

The restraint in some embodiments further comprise reversible fixing means such as magnets for securing the restraint to a baseplate or other surface such as a lab bench (e.g. stainless steel table top).

Example 13

Restraining Device Comprising a Body Restraint and a Body Part Cleat

Figure 34:
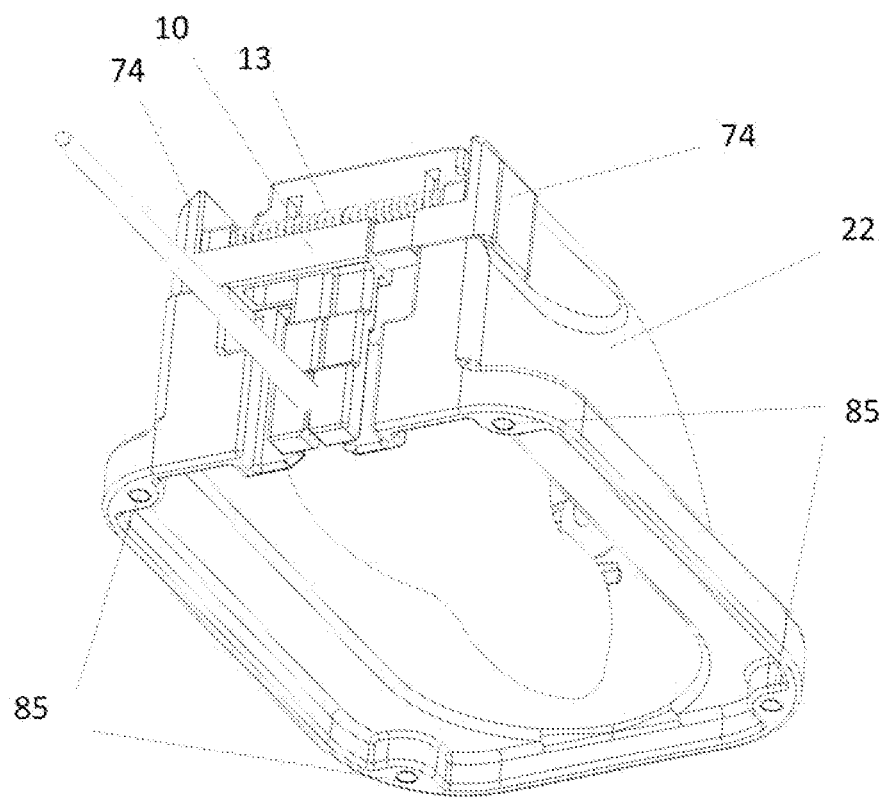
FIG. 34 depicts a restraining device comprising a body restraint and a body part restraint.

FIG. 34 depicts a useful restraining device of the present invention. The restraining device comprises a body restraint 22, for example, as detailed in Example 12, and a body part cleat 10, for example, as detailed in Example 10.

In one embodiment, the body restraint comprises reversible fixing means such as magnets 85. For example, magnets 85 can be secured to a metal table top, or can be specifically patterned to correspond to a pattern of magnets 78 on a baseplate 21, as depicted in FIG. 32.

The body part cleat 10 in some embodiments is fixed to the body restraint 22 such that the user can hold the entire restraining device in one hand with fingers (e.g. a thumb and an index finger) depressing tabs 74 of the body part cleat 10 to separate opposing members 11, 12 from each other. The user can then simultaneously restrain both trunk and the body part (e.g. tail) of the animal (e.g. mouse) simply by placing the restraining device over the animal such that the body part is positioned between opposing members 11, 12, and then releasing his fingers from tabs 74.

In one embodiment, such a restraining device optionally provides rapid but secure immobilization of an animal. In one embodiment, such a configuration allows a user to operate a second restraining device with a second hand, to simultaneously restrain two animals.

In one embodiment, a restraining device is used to restrain animals to perform procedures such as tail injections or clippings.

Example 14

Restraining Device Comprising a Body Part Plate Assembly and a Body Part Cleat

Figure 12:
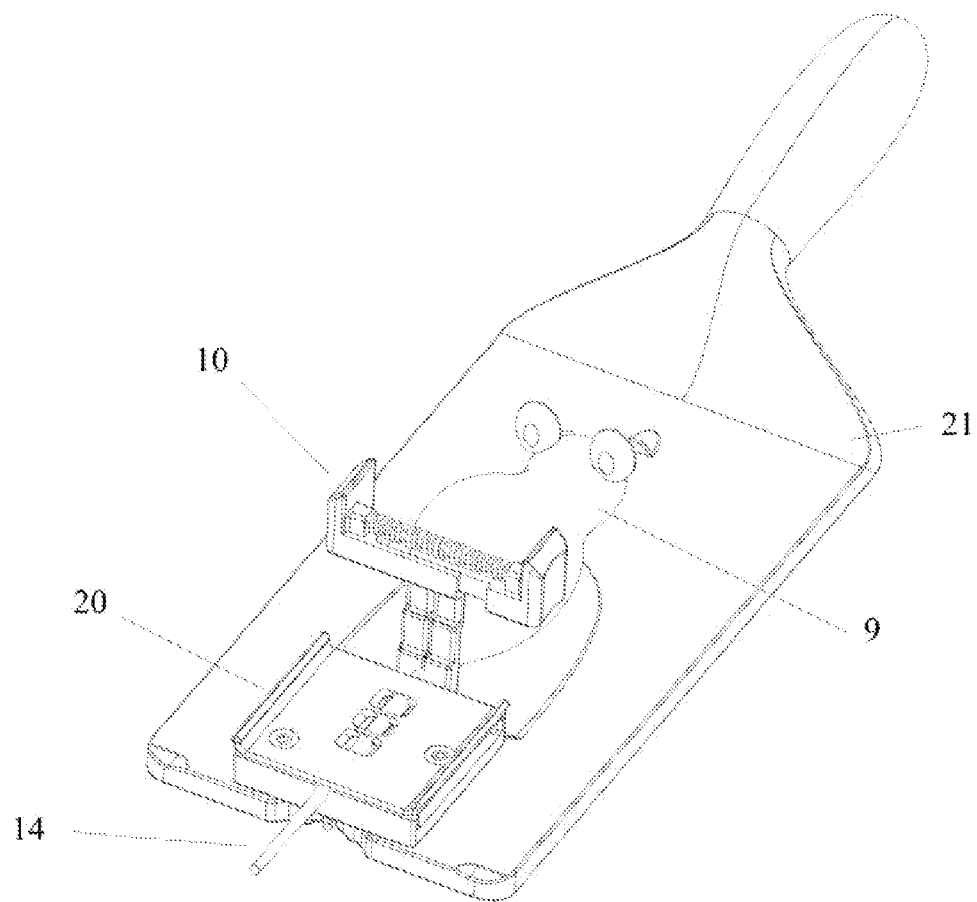
FIG. 12 depicts a restraining device.

FIG. 12 depicts a useful restraining device of the present invention. The restraining device comprises a tail cleat 10, as detailed in Example 10, and further comprises a tail plate assembly 20, as detailed in Example 11. The tail cleat 10 restrains the tail (or substrate portion thereof) from moving longitudinally (e.g. along the Y axis) while the tail plate assembly restrains the tail (or substrate portion thereof) from moving laterally and/or vertically (e.g. from movement along the X, Z, and/or R axes). In one embodiment, marks made on a substrate restrained by such a restraining device are extremely precise.

Although the components of the restraining device are in other embodiments directly supported by the primary baseplate of a marking system, the components of the restraining device can be supported by a baseplate 21 that is detachable from (reversibly fixed with respect to) the marking system. Such a configuration allows for rapid and consistent (error-free) loading and unloading of an animal into the restraining device. In addition, such a configuration allows the marking system to independently accommodate multiple restraining devices so that the marking system can mark a first animal in a first restraining device while the user loads a second animal in a second restraining device, thereby reducing the time required for marking a batch of animals.

Example 15

Figure 13:
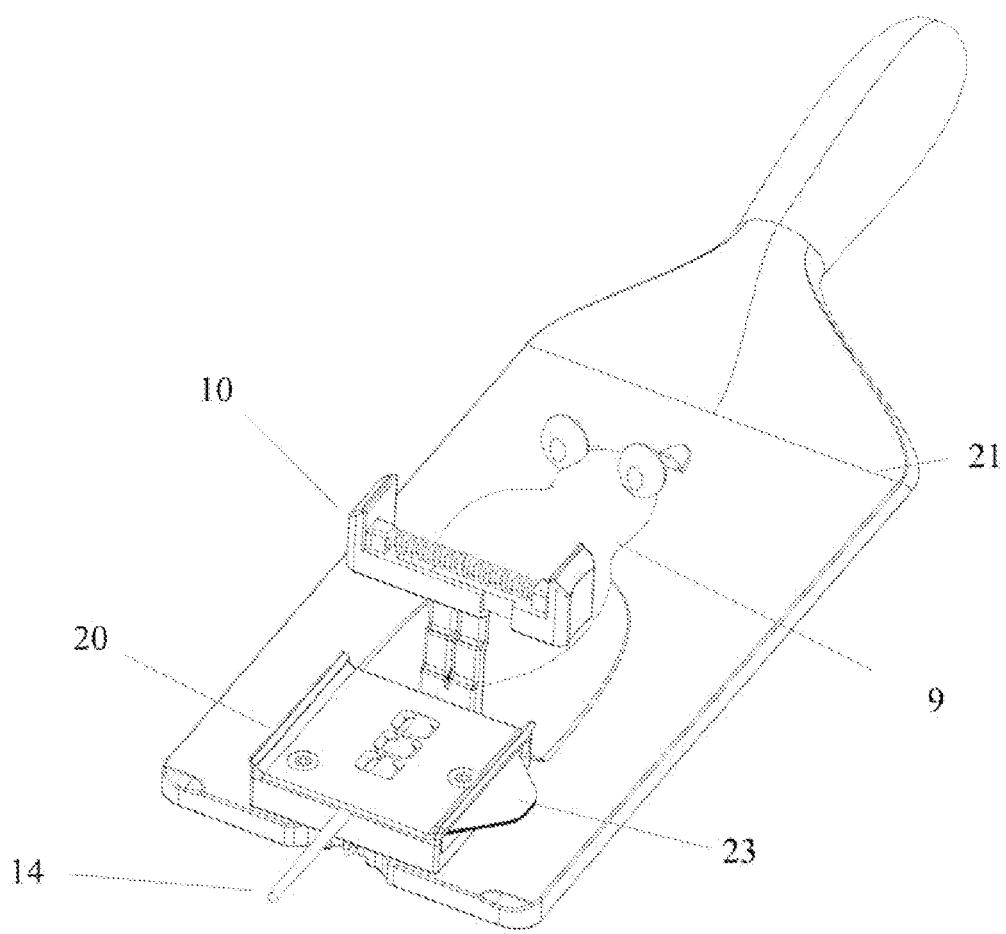
FIG. 13 depicts a restraining device and a media transfer assembly.

Restraining Device Comprising a Body Part Plate Assembly with a Media Transfer Assembly FIG. 13 depicts a useful restraining device of the present invention. The restraining device comprises a tail cleat 10 and a tail plate assembly 20, as detailed in Example 14. The devise further comprise a slot in the tail plate assembly 20 for acceptance of a media transfer assembly 23, as detailed in Example 8.

The restraining device components are in some embodiments supported, for example, by baseplate 21.

Example 16

Figure 14:
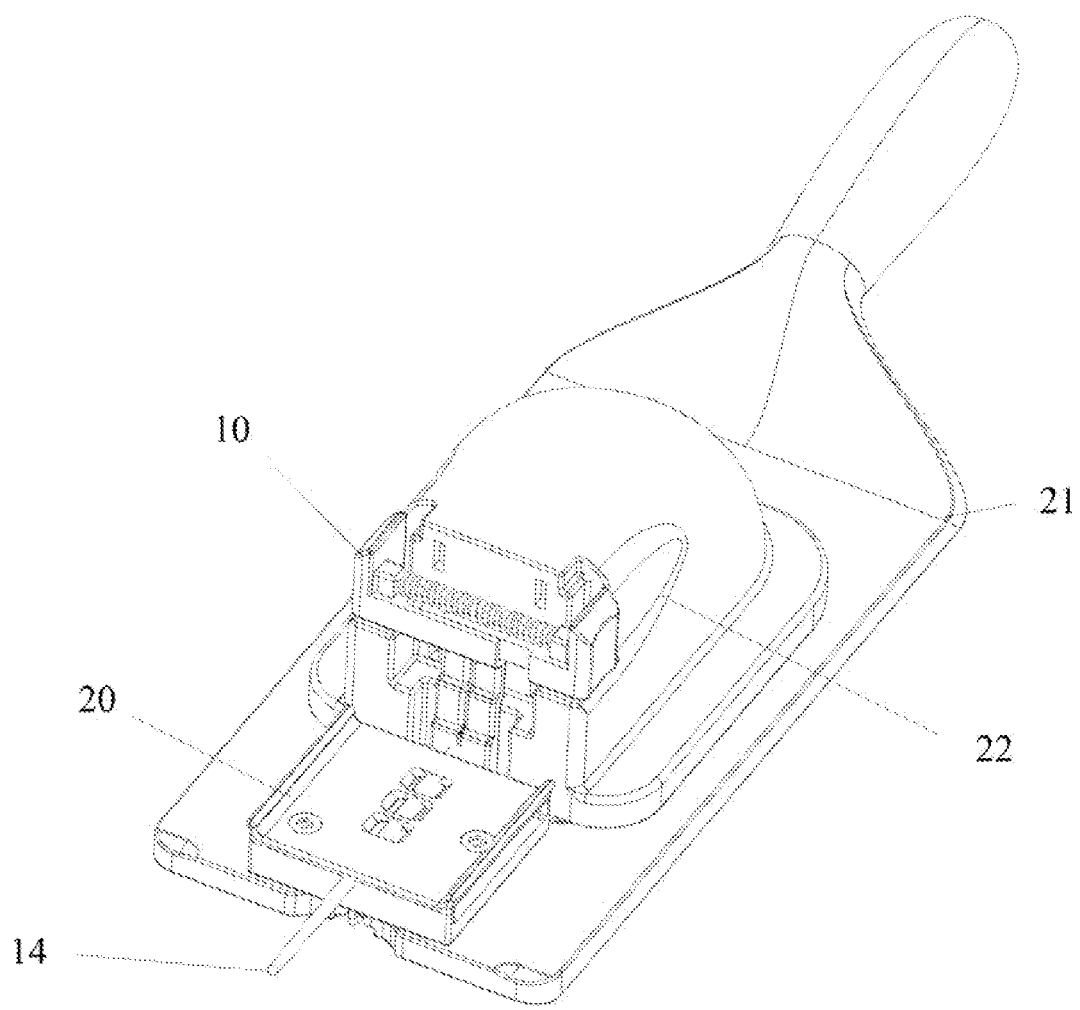
FIG. 14 depicts a restraining device.

Restraining Device Comprising a Body Part Plate Assembly, a Body Part Cleat, and a Body Restraint FIG. 14 depicts a useful restraining device of the present invention. The restraining device comprises a tail cleat 10 and a tail plate assembly 20, as detailed in Example 14. The restraining device further comprises a body restraint 22, as detailed in Example 12.

The restraining device components are in some embodiments supported, for example, by baseplate 21.

Example 17

Figure 15:
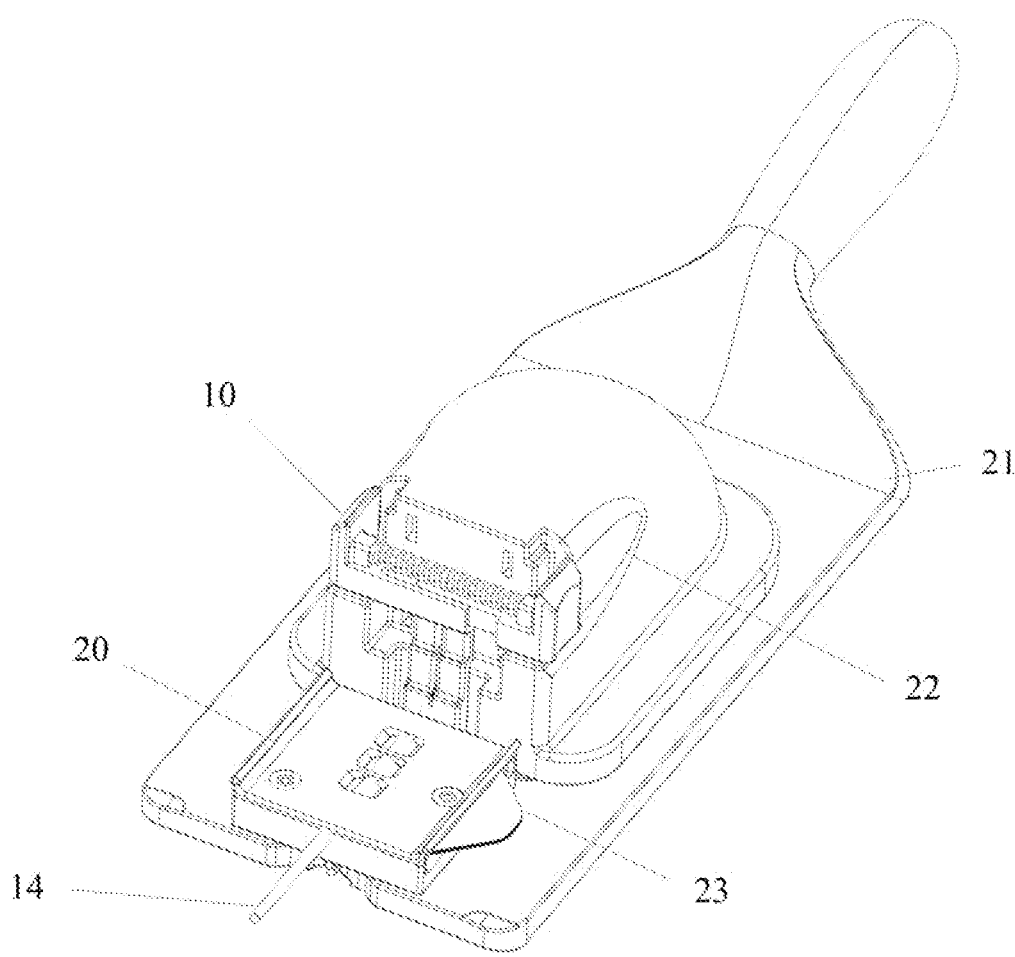
FIG. 15 depicts a restraining device and a media transfer assembly.

Restraining Device having a Body Part Cleat, a Body Restraint, and a Body Part Plate Assembly with a Media Transfer Assembly FIG. 15 depicts a useful restraining device of the present disclosure. The restraining device comprises a tail cleat 10, a tail plate assembly 20, and a body restraint 22, as detailed in Example 16. The devise further comprise a slot in the tail plate assembly 20 for acceptance of a media transfer assembly 23, as detailed in Example 8.

The restraining device components in some embodiments is supported, for example, by baseplate 21.

Example 18

Restraint Dock

FIG. 20 depicts a restraint dock useful to position an animal restraint in a fixed position relative to a robot assembly. The restraint dock 35 components can be directly supported by the marking system frame or by a dock support 40.

The restraint dock 35 can comprise one or more stops such as vertical (or Z axis) stops and/or longitudinal (or Y axis) stops ensure an animal restraint is in the proper position, such as the proper vertical (or Z axis) and/or longitudinal (or Y axis) position, respectively, relative to the robot assembly.

For example, the restraint dock 35 in some embodiments comprise a restraint support 39 and a lip 41 to accept a baseplate of an animal restraint. In some embodiments, the restraint dock 35 comprises stops (e.g. vertical stops) such as tabs 37, 38 to ensure proper vertical positioning and/or for securing a tail plate assembly or other body part restraint.

The restraint dock 35 in some embodiments further comprise a back stop 36 to ensure proper longitudinal (Y axis) positioning and/or for securing a tail plate assembly or other body part restraint about the Y axis.

In some embodiment, the restraint dock (or other component of the marking system) comprises sensors to detect the proper positioning of one or more animal restraint components, such as a sensor 75 (e.g. IR sensor or IR reflective sensor) to detect a tail plate assembly or other body part restraint, and a sensor 76 (e.g. IR sensor or IR reflective sensor) to detect a body restraint.

Taken alone or together, the sensors and the stops provide a safety mechanism which prevents improper positioning of an animal or substrate portion thereof. For example, in some embodiments if an animal restraint is in the improper orientation, the stops are used to block the animal restraint from being positioned for detection by the sensors, and the controller can be configured to wait until proper detection to begin the marking process.

Example 19

Robot Assembly

Figure 22:
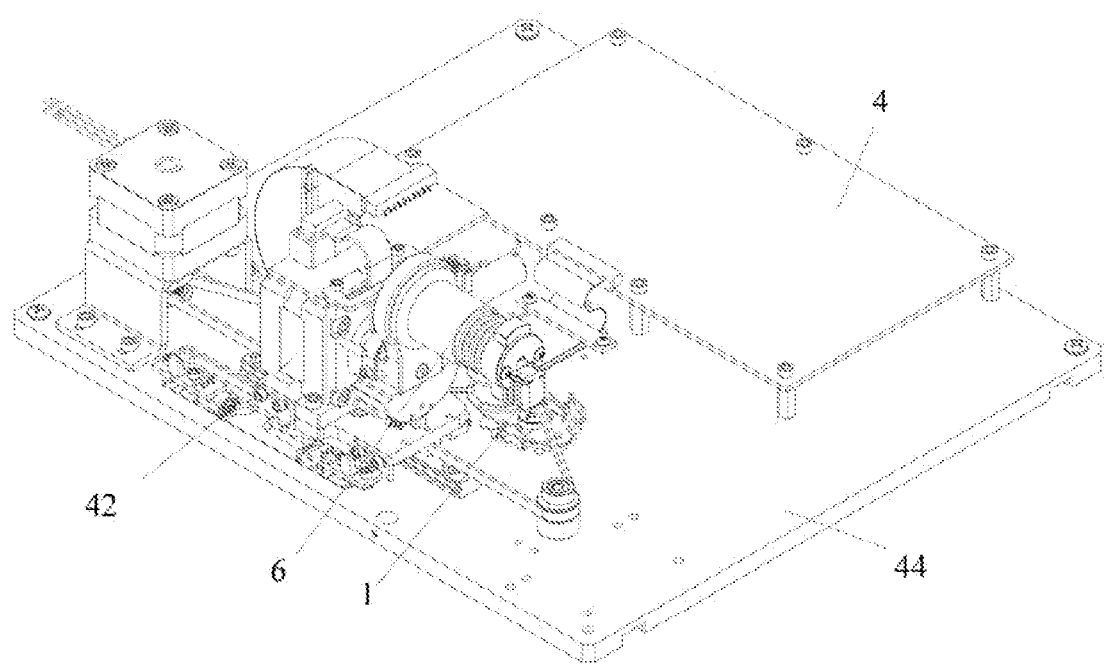
FIG. 22 depicts a robot assembly and controller.
Figure 23:
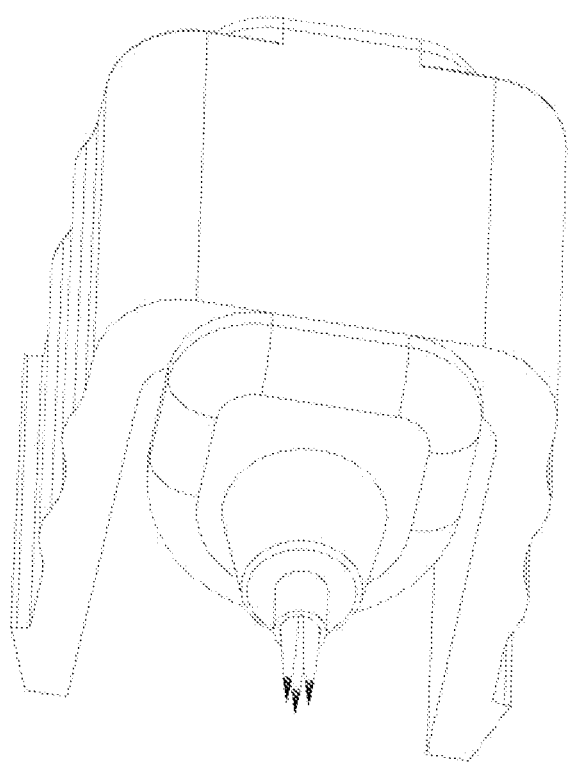
FIG. 23 depicts a marking device cartridge assembly.

One embodiment described herein provides a robot assembly, for example, as depicted in FIG. 22. The robot assembly 42 comprises a marking device such as needle cartridge assembly 1 coupled to a robot arm 6. The robot assembly 42 may be supported by a primary support 44 and controlled by controller 4. The marking device can move along the Y, theta, and R axes by the incorporation of Y, Theta, and R actuators, as depicted in FIG. 25.

The Y actuator comprises a Y actuator arm 49 which travels along the Y axis, for example, upon rail 65. Travel of the Y actuator arm 49 is powered by a motor such as stepper motor 52, optionally coupled to the Y actuator arm 49 by a belt such as timing belt 64.

The theta actuator comprises theta arm 50 is coupled to a motor such as stepper motor 53 to position the marking device 1 about the theta axis.

Figure 26:
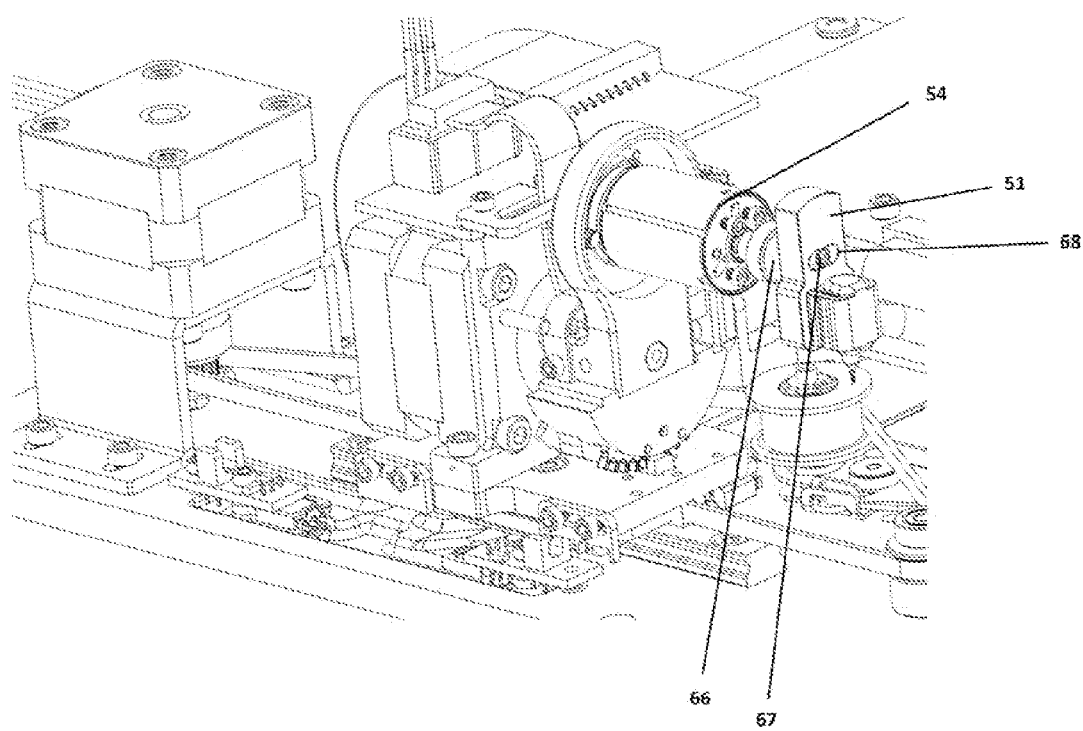
FIG. 26 depicts a robot assembly.

The R actuator is provided as a marking actuator by attaching the marking device 1 (e.g. needle cartridge) to a piston 51 which travels in a reciprocating motion along the R axis to provide a "stippling" effect with the marking device 1. The same R actuator is depicted in FIG. 26, but with the optional shell or mount 69 removed for illustrative purposes. Reciprocating motion of the marking device 1 about the R axis is provided by coupling piston 51 to an R actuator motor such as servo motor 54, or other self-encoded motor, by means of a crank 66 and crank pin 67. The motor (e.g. servo motor 54) can be PID-controlled (or other error-correcting algorithm) to provide an actuator, as discussed in Example 20.

Although any crank/piston configuration is contemplated by the present invention, a scotch yolk is optionally provided by coupling the piston 51 to crank pin 67 using a sliding yolk 68. In comparison to a conventional crank/piston configuration, a scotch yolk spends a greater period of time at top- and bottom-dead center. In one embodiment, the use of a scotch yolk provides enhanced pigment transfer due to the greater duration of dermal penetration or other contact with a substrate without harming the animal, for example, which might have been expected if the marking device moves along the Y or theta axes during dermal penetration (e.g. while repositioning the marking device for the next pixel during stippling).

Example 20

Development of an Actuator

An actuator motor (e.g. a motor of a reciprocating actuator or a motor coupled directly to a marking device, placed between a marking device and the robotic arm), such as that of an R-actuator or Z-actuator, is optionally provided as a servo motor or other self-encoded motor. The motor is further optionally controlled by PID (or controlled by another error-correcting algorithm). In one embodiment, such a motor provides one or more properties:
  enhanced safety;
  less wear and/or breakage on components such as marking devices;
  enhanced precision;
  reduced profile;
  elimination of a gross actuator, such as R axis or Z axis actuator (e.g. non-reciprocating actuator);
  reduced homing time to top dead center; or
  reduced time for making marks.

A marking device is often repositioned across an area between pixels or characters of a mark, or when completing a mark. Marking an animal often involves rapid, linearly reciprocating motion of a needle or other marking device as it repeatedly enters the dermis and/or other structures such as operation windows. In one embodiment, a motor can be used to home a reciprocating marking device without the need for a gross movement actuator. In one embodiment, the servo motor provided the additional advantage of providing a drastically reduced time to home the marking device.

Example 21

Robot Assembly with Robot Arm Position Sensors

One optional embodiment of the present invention provides a marking system comprising a robot assembly as detailed in Example 19, further comprising robot arm position sensors to provide information to provide positional information to a controller, for example, as depicted in FIG. 25. In a specific example, the marking system comprises a Y substrate-sensor 62 (e.g. photo interrupter) to detect a flag or series of flags 55 of the robot assembly when the Y actuator arm 49 has positioned the marking device 1 about the substrate portion of the animal (e.g. in the position depicted in FIG. 19). When the controller is configured to make a mark comprising a plurality of characters disposed about the Y axis, the flag or serious of flags 55 can comprise a flag corresponding to the position of each character, for example, three flags corresponding to each of three characters disposed about the Y axis. Optionally, the marking system comprises a Y home sensor 61 (e.g. photo interrupter) to detect a Y home flag 59 when the Y arm has been positioned in the Y home position.

Figure 27:
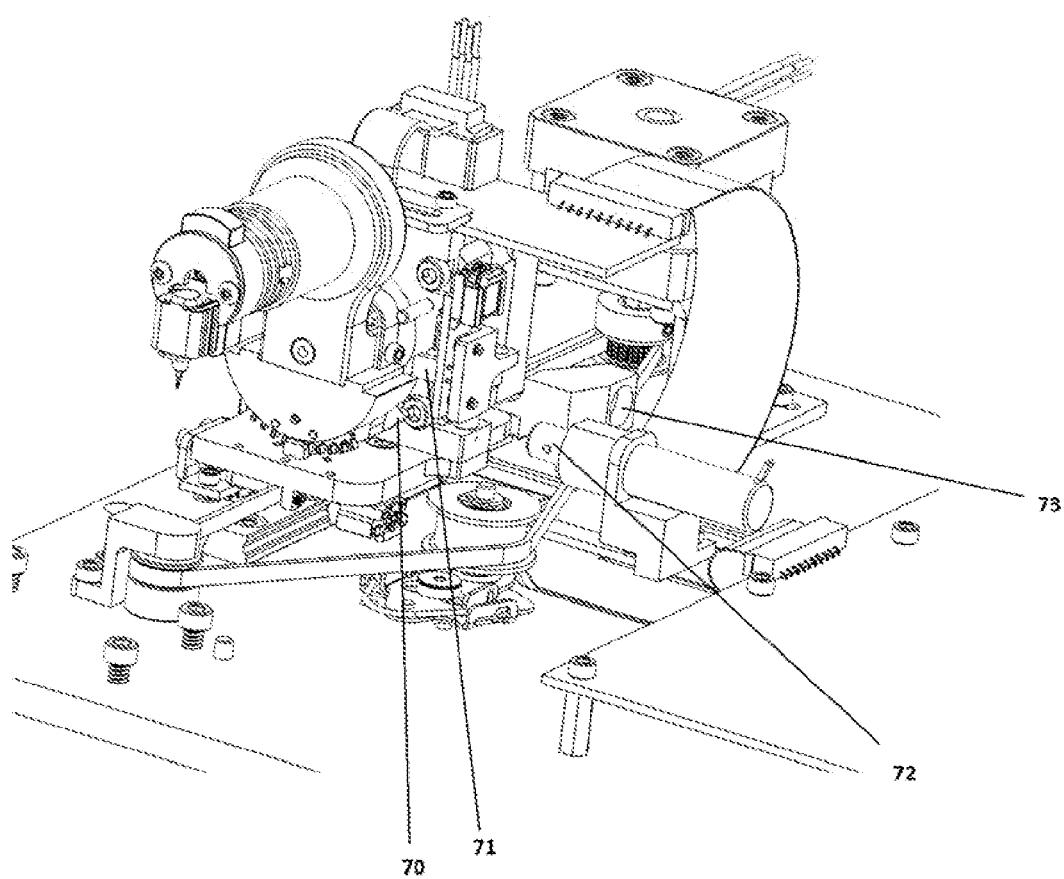
FIG. 27 depicts a robot assembly.
Figure 28:
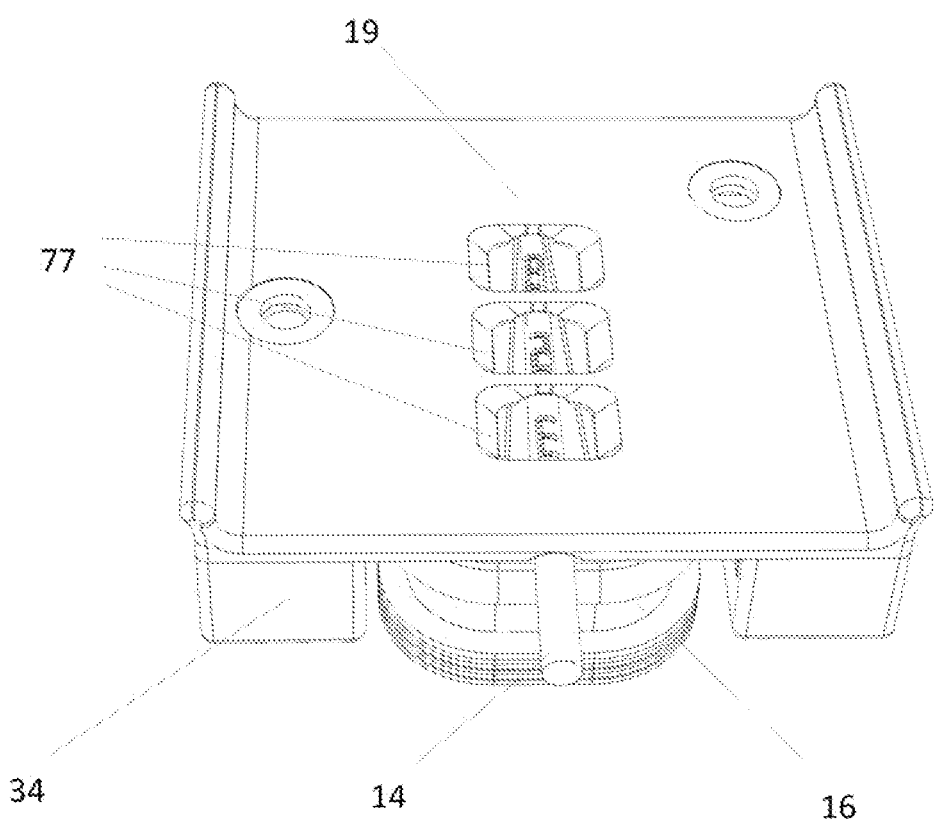
FIG. 28 depicts a body part plate assembly.

The marking system in some embodiments further comprise theta sensor 63 (e.g. photo interrupter) to and a theta flag or series of flags 60 to detect the theta position of the marking device 1. The system in some embodiments further comprise a theta home sensor 71 (e.g. photo interrupter) and a theta home flag 70, as depicted in FIG. 27.

Although the components in the motor illustrated in the figures, the use of a servo motor (e.g. servo motor 54, as depicted in FIG. 26) provides its own flags/sensors in the motor itself to detect the position of the marking device along the R axis.

If the robotic arm comprises a removable marking device such as a disposable needle cartridge, or other changeable component, the marking system can further comprise latch such as a solenoid latch 72 and a catch 73.

Example 22

Marking System

FIG. 19 depicts a marking system of the present invention. The marking system comprises a controller 4, and a robot assembly 42, for example, as detailed in Example 19 or Example 21. The restraining device comprises a body restraint 22, a body part cleat such as tail cleat 10, and a body part plate such as tail plate assembly 20, and a media transfer assembly 20 is inserted into the body part plate, for example, as detailed in Example 17. Before marking the animal, the animal is loaded in the restraining device and the baseplate 21 of the restraining device is docked into the restraint dock 20.

Example 23

Example Embodiments

The following example embodiments are illustrative of the present invention. The present invention also provides a marking system as set fort in the example embodiments, wherein the marking system is further limited by an optional feature taught herein. For example, in any of the example embodiment which comprises a biasing means, the biasing means can be one or more springs, as described herein. As another example, in any of the example embodiment which comprises a media transfer assembly comprising plies, outer plies (e.g. second and third plies) can be constructed from polyethylene or a ply with a VWTR taught herein. As another example, in any of the example embodiment, the robot arm can further comprise one or more sensors or sensor flags.

Example Embodiments (EE)

1. (EE1) A marking system comprising:
   a restraining device, a controller, and a robot assembly wherein:
   a) the robot assembly comprises a robotic arm, a marking device attached thereto, and one or more actuators for manipulating the robotic arm and marking with the marking device;
   b) the robot assembly and the restraining device are positioned in a fixed manner relative to one another;
   c) the restraining device comprises:
      a. a plate assembly comprising a first and a second opposing plate for acceptance of an animal body part;
      b. a cleat assembly comprising opposing tail cleats for acceptance of at least a portion of the animal body part; and
      c. a body restraint comprising a means to restrain the body
   d) the restraining device is oriented such that the marking device can make a mark on a substrate, wherein the substrate is a portion of the animal body part, and
   e) the controller is configured to control the position of the marking device by actuating the one or more actuators.

2. A marking system comprising:
   a restraining device, a controller, and a robot assembly wherein:
   a) the robot assembly comprises a robotic arm, a marking device attached thereto, and one or more actuators for manipulating the robotic arm and marking with the marking device;
   b) the robot assembly and the restraining device are positioned in a fixed manner relative to one another;
   c) the restraining device comprises:
      a. a plate assembly comprising a first and a second opposing plate for acceptance of an animal body part;
      b. a cleat assembly comprising opposing tail cleats for acceptance of at least a portion of the animal body part; and
      c. a body restraint comprising a means to restrain the body
   d) the restraining device is oriented such that the marking device can make a mark on a substrate, wherein the substrate is a portion of the animal body part;
   e) the controller is configured to control the position of the marking device by actuating the one or more actuators; and
   f) the animal is a mouse, rat, rodent, or laboratory animal and/or the body part is a tail.

3. A marking system comprising:
   a restraining device, a controller, and a robot assembly wherein:
   a) the robot assembly comprises a robotic arm, a marking device attached thereto, and one or more actuators for manipulating the robotic arm and marking with the marking device;
   b) the robot assembly and the restraining device are positioned in a fixed manner relative to one another;
   c) the restraining device comprises:
      a. a plate assembly comprising a first and a second opposing plate for acceptance of an animal body part; and
      b. a cleat assembly comprising opposing tail cleats for acceptance of at least a portion of the animal body part;
   d) the restraining device is oriented such that the marking device can make a mark on a substrate, wherein the substrate is a portion of the animal body part; and
   e) the controller is configured to control the position of the marking device by actuating the one or more actuators.

4. A marking system comprising:
   a restraining device, a controller, and a robot assembly wherein:
   a) the robot assembly comprises a robotic arm, a marking device attached thereto, and one or more actuators for manipulating the robotic arm and marking with the marking device;
   b) the robot assembly and the restraining device are positioned in a fixed manner relative to one another;
   c) the restraining device comprises:
      a. a plate assembly comprising a first and a second opposing plate for acceptance of an animal body part; and
      b. a cleat assembly comprising opposing tail cleats for acceptance of at least a portion of the animal body part;
   d) the restraining device is oriented such that the marking device can make a mark on a substrate, wherein the substrate is a portion of the animal body part; and e) the controller is configured to control the position of the marking device by actuating the one or more actuators;

f) the animal is a mouse, rat, rodent, or laboratory animal and/or the body part is a tail.

5. The marking system of any preceding EE, wherein the plate assembly comprises:
   a. a first and a second opposing plate for acceptance of an animal body part; and
   b. one or more operation windows in the first plate, wherein the first plate is proximal to the marking device relative to the second plate.

6. A marking system comprising:
   a restraining device, a controller, and a robot assembly wherein:
   a) the robot assembly comprises a robotic arm, a marking device attached thereto, and one or more actuators for manipulating the robotic arm and marking with the marking device;
   b) the robot assembly and the restraining device are positioned in a fixed manner relative to one another;
   c) the restraining device comprises a plate assembly comprising:
      i. a first and a second opposing plate for acceptance of an animal body part; and
      ii. one or more operation windows in the first plate, wherein the first plate is proximal to the marking device relative to the second plate;
   d) the restraining device is oriented such that the marking device can make a mark on a substrate by moving through an operation window of the one or more operation windows, wherein the substrate is a portion of the animal body part, and
   e) the controller is configured to control the position of the marking device by actuating the one or more actuators.

7. A marking system comprising:
   a restraining device, a controller, and a robot assembly wherein:
   a) the robot assembly comprises a robotic arm, a marking device attached thereto, and one or more actuators for manipulating the robotic arm and marking with the marking device;
   b) the robot assembly and the restraining device are positioned in a fixed manner relative to one another;
   c) the restraining device comprises a plate assembly comprising:
      i. a first and a second opposing plate for acceptance of an animal body part; and
      ii. one or more operation windows in the first plate, wherein the first plate is proximal to the marking device relative to the second plate;
   d) the restraining device is oriented such that the marking device can make a mark on a substrate by moving through an operation window of the one or more operation windows, wherein the substrate is a portion of the animal body part,
   e) the controller is configured to control the position of the marking device by actuating the one or more actuators; and
   f) the animal is a mouse, rat, rodent, or laboratory animal and/or the body part is a tail.

8. The marking system of any preceding EE, wherein the plate assembly comprises:
   i. a first and a second opposing plate for acceptance of an animal body part; and
   ii. a guide for positioning the animal body part along a desired about the plate assembly; optionally, wherein the guide comprises one or more grooves selected from:
      a. a radial groove in the first plate; and
      b. a tapered groove, a v-groove, or a tapered v-groove in the second plate;

9. The marking system of any preceding EE, wherein the plate assembly comprises:
   i. a first and a second opposing plate for acceptance of an animal body part; and
   ii. a biasing means for biasing the second plate to oppose the first plate and sandwich the animal body part, optionally, wherein the biasing means is:
      A. an elastic biasing means; or
      B. a conformative biasing means for conforming the orientation of the second plate with respect to the first plate such that, when restrained, the animal body part is flush juxtaposed to the first plate.

10. A marking system comprising:
    a restraining device, a controller, and a robot assembly wherein:
    a) the robot assembly comprises a robotic arm, a marking device attached thereto, and one or more actuators for manipulating the robotic arm and marking with the marking device;
    b) the robot assembly and the restraining device are positioned in a fixed manner relative to one another;
    c) the restraining device comprises a plate assembly comprising:
       i. a first and a second opposing plate for acceptance of an animal body part; and
       ii. a biasing means for biasing the second plate to oppose the first plate and sandwich the animal body part, optionally, wherein the biasing means is:
          C. an elastic biasing means; or
          D. a conformative biasing means for conforming the orientation of the second plate with respect to the first plate such that, when restrained, the animal body part is flushly juxtaposed with the first plate;
    d) the restraining device is oriented such that the marking device can make a mark on a substrate, wherein the substrate is a portion of the animal body part; and
    e) the controller is configured to control the position of the marking device by actuating the one or more actuators.

11. A marking system comprising:
    a restraining device, a controller, and a robot assembly wherein:
    a) the robot assembly comprises a robotic arm, a marking device attached thereto, and one or more actuators for manipulating the robotic arm and marking with the marking device;
    b) the robot assembly and the restraining device are positioned in a fixed manner relative to one another;
    c) the restraining device comprises a plate assembly comprising:
       iii. a first and a second opposing plate for acceptance of an animal body part;
       iv. a guide for positioning the animal body part along a desired about the plate assembly; optionally, wherein the guide comprises one or more grooves selected from:
          a. a radial groove in the first plate; and
          b. a tapered groove, a v-groove, or a tapered v-groove in the second plate;

d) the restraining device is oriented such that the marking device can make a mark on a substrate, wherein the substrate is a portion of the animal body part; and
e) the controller is configured to control the position of the marking device by actuating the one or more actuators.

12. A marking system comprising:
a restraining device, a controller, and a robot assembly wherein:
a) the robot assembly comprises a robotic arm, a marking device attached thereto, and one or more actuators for manipulating the robotic arm and marking with the marking device;
b) the robot assembly and the restraining device are positioned in a fixed manner relative to one another;
c) the restraining device comprises a plate assembly comprising:
 i. a first and a second opposing plate for acceptance of an animal body part;
 ii. a biasing means for biasing the second plate to oppose the first plate and sandwich the animal body part, optionally, wherein the biasing means is:
  a. an elastic biasing means; or
  b. a conformative biasing means for conforming the orientation of the second plate with respect to the first plate such that, when restrained, the animal body part is flushly juxtaposed with the first plate; and
 iii. a guide for positioning the animal body part about the plate assembly; optionally, wherein the guide comprises one or more grooves selected from:
  c. a radial groove in the first plate; and
  d. a tapered groove, a v-groove, or a tapered v-groove in the second plate;
d) the restraining device is oriented such that the marking device can make a mark on a substrate, wherein the substrate is a portion of the animal body part; and
e) the controller is configured to control the position of the marking device by actuating the one or more actuators.

13. A marking system comprising:
a restraining device, a controller, and a robot assembly wherein:
a) the robot assembly comprises a robotic arm, a marking device attached thereto, and one or more actuators for manipulating the robotic arm and marking with the marking device;
b) the robot assembly and the restraining device are positioned in a fixed manner relative to one another;
c) the restraining device comprises a plate assembly comprising:
 i. a first and a second opposing plate for acceptance of an animal body part; and
 ii. a biasing means for biasing the second plate to oppose the first plate and sandwich the animal body part, optionally, wherein the biasing means is:
  A. an elastic biasing means; or
  B. a conformative biasing means for conforming the orientation of the second plate with respect to the first plate such that, when restrained, the animal body part is flushly juxtaposed with the first plate;
d) the restraining device is oriented such that the marking device can make a mark on a substrate, wherein the substrate is a portion of the animal body part;
e) the controller is configured to control the position of the marking device by actuating the one or more actuators; and
f) the animal is a mouse, rat, rodent, or laboratory animal and/or the body part is a tail.

14. A marking system comprising:
a restraining device, a controller, and a robot assembly wherein:
a) the robot assembly comprises a robotic arm, a marking device attached thereto, and one or more actuators for manipulating the robotic arm and marking with the marking device;
b) the robot assembly and the restraining device are positioned in a fixed manner relative to one another;
c) the restraining device comprises a plate assembly comprising:
 i. a first and a second opposing plate for acceptance of an animal body part; and
 ii. a guide for positioning the animal body part along a desired about the plate assembly; optionally, wherein the guide comprises one or more grooves selected from:
  a. a radial groove in the first plate; and
  b. a tapered groove, a v-groove, or a tapered v-groove in the second plate;
d) the restraining device is oriented such that the marking device can make a mark on a substrate, wherein the substrate is a portion of the animal body part;
e) the controller is configured to control the position of the marking device by actuating the one or more actuators'; and
f) the animal is a mouse, rat, rodent, or laboratory animal and/or the body part is a tail.

15. A marking system comprising:
a restraining device, a controller, and a robot assembly wherein:
a) the robot assembly comprises a robotic arm, a marking device attached thereto, and one or more actuators for manipulating the robotic arm and marking with the marking device;
b) the robot assembly and the restraining device are positioned in a fixed manner relative to one another;
c) the restraining device comprises a plate assembly comprising:
 i. a first and a second opposing plate for acceptance of an animal body part;
 ii. biasing means for biasing the second plate to oppose the first plate and sandwich the animal body part, optionally, wherein the biasing means is:
  a. an elastic biasing means; or
  b. a conformative biasing means for conforming the orientation of the second plate with respect to the first plate such that, when restrained, the animal body part is flushly juxtaposed with the first plate; and
 iii. a guide for positioning the animal body part about the plate assembly; optionally, wherein the guide comprises one or more grooves selected from:
  a. a radial groove in the first plate; and
  b. a tapered groove, a v-groove, or a tapered v-groove in the second plate;
d) the restraining device is oriented such that the marking device can make a mark on a substrate, wherein the substrate is a portion of the animal body part;
e) the controller is configured to control the position of the marking device by actuating the one or more actuators; and f) the animal is a mouse, rat, rodent, or laboratory animal and/or the body part is a tail.

16. The marking system of any preceding EE wherein a first actuator of the one or more actuators comprises a motor coupled to a piston, wherein the marking device is attached to the piston to provide a cyclically-actuated marking device; optionally, the motor is a servo motor and optionally, the first actuator comprises a scotch yolk.

17. A marking system comprising:
a restraining device, a controller, and a robot assembly wherein:
   a) the robot assembly comprises a robotic arm, a marking device attached thereto, and one or more actuators for manipulating the robotic arm and marking with the marking device;
   b) the robot assembly and the restraining device are positioned in a fixed manner relative to one another;
   c) the restraining device is sized and configured for restraining an animal or animal body part thereof and oriented such that the marking device can make a mark on a substrate portion of the animal body part;
   d) the controller is configured to control the position of the marking device by actuating the one or more actuators;
   e) a first actuator of the one or more actuators comprises a motor coupled to a piston, wherein the marking device is attached to the piston a cyclically-actuated marking device;
   f) optionally, the motor is a servo motor; and
   g) optionally, the first actuator comprises a scotch yolk.

18. A marking system comprising:
a restraining device, a controller, and a robot assembly wherein:
   a) the robot assembly comprises a robotic arm, a marking device attached thereto, and one or more actuators for manipulating the robotic arm and marking with the marking device;
   b) the robot assembly and the restraining device are positioned in a fixed manner relative to one another;
   c) the restraining device is sized and configured for restraining an animal or animal body part thereof and oriented such that the marking device can make a mark on a substrate portion of the animal body part;
   d) the controller is configured to control the position of the marking device by actuating the one or more actuators;
   e) a first actuator of the one or more actuators comprises a motor coupled to a piston, wherein the marking device is attached to the piston a cyclically-actuated marking device;
   f) the animal is a mouse, rat, rodent, or laboratory animal and/or the body part is a tail;
   g) optionally, the motor is a servo motor; and
   h) optionally, the first actuator comprises a scotch yolk.

19. The marking system of any preceding EE, wherein the robot assembly and the restraining device are positioned in said fixed manner relative to one another by a first reversible-fixing means.

20. The marking system of the preceding EE, wherein the restraining device comprises a baseplate, wherein the reversible fixing means comprises a restraint dock, wherein:
the restraint dock and the robot assembly are positioned in a fixed manner relative to one another;
the restraint dock is configured to reversibly accept the baseplate; optionally wherein the one or more components of the restraining components of the restraining device are reversibly fixed to the base plate by a second reversible-fixing means; and
optionally, wherein the second reversible-fixing means comprises one or more magnets.

21. The marking system of EE 19, wherein the first reversible-fixing means comprises one or more magnets.

22. A marking system comprising:
a restraining device, a controller, and a robot assembly wherein:
   a) the robot assembly comprises a robotic arm, a marking device attached thereto, and one or more actuators for manipulating the robotic arm and marking with the marking device;
   b) the robot assembly and the restraining device are positioned in a fixed manner relative to one another;
   c) the restraining device is sized and configured for restraining an animal or animal body part thereof and oriented such that the marking device can make a mark on a substrate portion of the animal body part;
   d) the controller is configured to control the position of the marking device by actuating the one or more actuators; and
   e) the robot assembly and the restraining device are positioned in said fixed manner relative to one another by a first reversible-fixing means.

23. A marking system comprising:
a restraining device, a controller, and a robot assembly wherein:
   a) the robot assembly comprises a robotic arm, a marking device attached thereto, and one or more actuators for manipulating the robotic arm and marking with the marking device;
   b) the robot assembly and the restraining device are positioned in a fixed manner relative to one another;
   c) the restraining device is sized and configured for restraining an animal or animal body part thereof and oriented such that the marking device can make a mark on a substrate portion of the animal body part;
   d) the controller is configured to control the position of the marking device by actuating the one or more actuators;
   e) wherein the robot assembly and the restraining device are positioned in said fixed manner relative to one another by a first reversible-fixing means; and
   f) the animal is a mouse, rat, rodent, or laboratory animal and/or the body part is a tail.

24. The marking system of the preceding EE, wherein the restraining device comprises a baseplate and further comprises one or more of a body restraint and a body part restraint, wherein the reversible fixing means comprises a restraint dock, wherein:
the restraint dock and the robot assembly are positioned in a fixed manner relative to one another; and
the restraint dock is configured to reversibly accept the baseplate; optionally wherein the one or more of a body restraint and a body part restraint are reversibly fixed to the base plate by a second reversible-fixing means; and
optionally, the second reversible-fixing means comprises one or more magnets.

25. The marking system of any preceding EE, wherein the one or more actuators actuate along a Y, a theta, and an R axis.

26. A marking system comprising:
a restraining device, a controller, and a robot assembly wherein:

a) the robot assembly comprises a robotic arm, a marking device attached thereto, and one or more actuators for manipulating the robotic arm and marking with the marking device;
b) the robot assembly and the restraining device are positioned in a fixed manner relative to one another;
c) the restraining device is sized and configured for restraining an animal or animal body part thereof and oriented such that the marking device can make a mark on a substrate portion of the animal body part;
d) the controller is configured to control the position of the marking device by actuating the one or more actuators; and
e) the one or more actuators actuate along a Y, a theta, and an R axis.

27. A marking system comprising:
a restraining device, a controller, and a robot assembly wherein:
a) the robot assembly comprises a robotic arm, a marking device attached thereto, and one or more actuators for manipulating the robotic arm and marking with the marking device;
b) the robot assembly and the restraining device are positioned in a fixed manner relative to one another;
c) the restraining device is sized and configured for restraining an animal or animal body part thereof and oriented such that the marking device can make a mark on a substrate portion of the animal body part;
d) the controller is configured to control the position of the marking device by actuating the one or more actuators;
e) the one or more actuators actuate along a Y, a theta, and an R axis; and
i) the animal is a mouse, rat, rodent, or laboratory animal and/or the body part is a tail.

28. The marking system of any preceding EE, wherein the one or more actuators for marking with the marking device comprises a servo motor and wherein the servo motor is coupled to the marking device by a piston for cyclical movement of the marking device.

29. The marking system of the preceding EE, wherein the controller comprises a proportional-integral-derivative (PID) algorithm for controlling the servo motor.

30. A marking system comprising:
a controller and a robot assembly wherein:
a) the robot assembly comprises a robotic arm, a marking device attached thereto, and one or more actuators for manipulating the robotic arm and marking with the marking device;
b) the restraining device is sized and configured for restraining an animal or animal body part thereof and oriented such that the marking device can make a mark on a substrate portion of the animal body part;
c) the controller is configured to control the position of the marking device by actuating the one or more actuators;
d) a first actuator of the one or more actuators comprises a servo motor coupled to a piston, wherein the marking device is attached to the piston a cyclically-actuated marking device; and
e) optionally the first actuator comprises a scotch yolk.

31. The marking system of any preceding EE, wherein the restraining device comprises a body restraint, wherein the body restraint comprises a tube, a container, a dome, or housing for acceptance of one or more of the trunk and the head of the animal.

32. The marking system of the preceding EE, wherein the housing filters light in the visible-light spectrum of the animal and optionally wherein the housing is opaque to the animal but transparent to a human.

33. The marking system of any preceding EE wherein the marking device comprises a needle, bar, or stamp.

34. The marking system of the preceding EE further comprising a media transfer assembly comprising a pigment, wherein the marking device can make a mark by contacting the pigment and then contacting the substrate to be marked.

35. The marking system of the preceding EE wherein the media transfer assembly further comprises a first ply wherein the pigment is affixed to or impregnated in the first ply.

36. The marking system of the preceding EE wherein the media transfer assembly further comprises a second ply and a third ply wherein the second ply is proximal to the first ply relative to the substrate to be marked and a third ply is distal to the first ply relative to the substrate to be marked 37. The marking system of the preceding EE wherein:
a. the media transfer assembly further comprises one or more first indexing members;
b. the restraining device further comprises one or more second indexing members; and
c. the media transfer assembly is juxtaposed to the substrate portion of the animal body part when the one or more first indexing members are aligned with the one or more second indexing members.

We claim:

1. A marking system comprising:
a restraining device, a controller, and a robot assembly wherein:
a) the robot assembly comprises a robotic arm, a marking device attached thereto, and one or more actuators for manipulating the robotic arm and marking with the marking device;
b) the robot assembly and the restraining device are positioned in a fixed manner relative to one another;
c) the restraining device is sized and configured for restraining an animal or animal body part thereof and oriented such that the marking device can make a mark on a substrate portion of the animal body part;
d) the controller is configured to control the position of the marking device and to make a mark on the substrate portion of the animal body part by actuating the one or more actuators; and
e) the animal is a mouse, a rat, or a rodent; and
f) the body part is a tail.

2. The marking system of claim 1 wherein the marking device comprises a needle, bar, or stamp.

3. The marking system of claim 2 further comprising a media transfer assembly comprising a pigment, wherein the marking device can make a mark by contacting the pigment and then contacting the substrate portion.

4. The marking system of claim 3 wherein the media transfer assembly further comprises a first ply wherein the pigment is affixed to or impregnated in the first ply.

5. The marking system of claim 4 wherein the media transfer assembly further comprises a second ply and a third ply wherein the second ply is proximal to the first ply relative to the substrate portion and the third ply is distal to the first ply relative to the substrate to be marked.

6. The marking system of claim 5 wherein:
a. the media transfer assembly further comprises one or more first indexing members;
b. the restraining device further comprises one or more second indexing members; and c. the media transfer assembly is juxtaposed to the substrate portion of the animal body part when the one or more first indexing members are aligned with the one or more second indexing members.

7. The marking system of claim 3, wherein the media transfer assembly comprises a first ply, a second ply, and a third ply, wherein:
   a. the second ply is layered between the first ply and the third ply;
   b. each of the first ply and the third ply comprises a material having a thickness which provides a water vapor transmission rate (WVTR) sufficient to inhibit substantial water vapor transmission there through.
   optionally, each of the first ply and the third ply further comprises a plastic.

8. The marking system of claim 1, wherein the restraining device comprises a body part plate assembly comprising a first and a second opposing plate for acceptance of the animal body part.

9. The marking system of claim 8, wherein the body part plate assembly:
   a. is configured for acceptance of the substrate portion of the body part; and
   b. comprises one or more operation windows in the first plate, wherein the first plate proximal to the marking device relative to the second plate;
   optionally, the marking device can make a mark on the substrate portion of the body part by moving through an operation window of the one or more operation windows.

10. The marking system of claim 9, wherein the restraining device comprises biasing means for biasing the second plate against the first plate and optionally wherein: the biasing means is an elastic biasing means; or
    the biasing means is a conformative biasing means for conforming the orientation of the second plate with respect to the first plate such that, when restrained, a conical or tapered substrate portion of the body part is flushly juxtaposed to the first plate.

11. The marking system of claim 10, wherein the body part plate assembly comprises a guide for positioning the animal body part about the body plate assembly and optionally wherein:
    a. the first plate comprises a groove in the side proximal to the body part, or
    b. the first plate comprises a radial groove in the side proximal to the body part; and optionally wherein:
    a. the second plate comprises a groove in the side proximal to the body part, or
    b. the second plate comprises a groove in the side proximal to the body part selected from a v-groove, a tapered groove, and a tapered v-groove.

12. The marking system of claim 10, wherein the restraining device comprises a body part cleat assembly comprising laterally opposing body part cleats for acceptance of at least a portion of the body part, and wherein the body part cleats are biased against each other with sufficient force to prevent longitudinal movement of the body part.

13. The marking system of claim 10, wherein the restraining device further comprises a body restraint, wherein the body restraint comprises a tube, a container, a dome, or housing for acceptance of one or more of the trunk and the head of the animal.

14. The marking system of claim 13, wherein the housing filters light in the visible-light spectrum of the animal, and optionally wherein the housing is opaque to the animal and transparent to a human.

15. The marking system of claim 1, wherein the robot assembly and the restraining device are positioned in said fixed manner relative to one another by a first reversible-fixing means.

16. The marking system of claim 15, wherein the restraining device comprises a baseplate and further comprises one or more of a body restraint and a body part restraint, wherein:
    the reversible fixing means comprises a restraint dock;
    the restraint dock and the robot assembly are positioned in a fixed manner relative to one another;
    the restraint dock is configured to reversibly accept the baseplate;
    optionally the one or more of a body restraint and a body part restraint are reversibly fixed to the base plate by a second reversible-fixing means; and
    optionally, the second reversible-fixing means comprises one or more magnets.

17. The marking system of claim 1, wherein the one or more actuators for marking with the marking device are configured for actuating the marking device along a Y, a theta, and an R axis.

18. The marking system of claim 17, wherein the R axis actuator is positioned between the marking device and the robotic arm.

19. The marking system of claim 1, wherein the one or more actuators for marking with the marking device comprises a servo motor, wherein the marking device is coupled to a piston, and the piston is coupled to the servo motor by a crank arm for cyclical movement of the marking device.

20. The marking system of claim 19, wherein the controller comprises a proportional-integral-derivative (PID) algorithm for controlling the servo motor.

21. A method of making a mark comprising marking an animal body part with the marking system of claim 1, wherein the animal is restrained in the restraining device, optionally wherein the animal is a mouse.

22. The method of claim 21, wherein the restraining device comprises a body restraint device and a tail restraint, wherein the mark is applied to the animal tail.

23. The marking system of claim 1, wherein the restraining device for restraining an animal or body part thereof comprises a body restraint and a body part cleat assembly, wherein:
    the body restraint is the housing for acceptance of one or more of the trunk and the head of the animal; and
    the body part cleat assembly comprises laterally opposing body part cleats for acceptance of at least a portion of the animal body part, wherein the body part cleats are biased against each other with sufficient force to prevent longitudinal movement of the body part; and
    optionally wherein the animal is a mouse; and
    optionally wherein the body part is a tail.

24. A marking system for marking a mouse, rat or rodent comprising a restraining device, a controller, and a robot assembly wherein:
    a. the robot assembly comprises a robotic arm, a marking device attached thereto, and one or more actuators for manipulating the robotic arm and for marking with the marking device;
    b. the robot assembly and the restraining device are positioned in a fixed manner relative to one another;
    c. the restraining device comprises:
       i. a plate assembly comprising:
          1. a first and a second opposing plate for acceptance of the mouse, rat or rodent body part;

2. one or more operation windows in the first plate, wherein the first plate is proximal to the marking device relative to the second plate;
3. a biasing means for biasing the second plate to oppose the first plate and sandwich the mouse, rat or rodent body part; and
4. a guide for positioning the mouse, rat or rodent body part about the plate assembly;
   ii. a cleat assembly comprising opposing tail cleats for acceptance of at least a portion of the mouse, rat or rodent body part; and
   iii. a body restraint comprising a means to restrain the body;
d. the restraining device is oriented such that the marking device can make a mark on a substrate, wherein the substrate is a portion of the mouse, rat or rodent body part; the one or more actuators actuate along a Y, a theta, and an R axis;
f. the controller is configured to control the position of the marking device and to make a mark on the substrate portion of the mouse, rat or rodent body part by actuating the one or more actuators; and
g. optionally the mark is formed from a bio-safe and bio-permanent pigment.

* * * * *